US012177910B2

(12) United States Patent
Li et al.

(10) Patent No.: US 12,177,910 B2
(45) Date of Patent: Dec. 24, 2024

(54) RANDOM ACCESS MESSAGE REPETITION TECHNIQUES IN BEAMFORMED COMMUNICATIONS

(71) Applicant: Qualcomm Incorporated, San Diego, CA (US)

(72) Inventors: Qiaoyu Li, Beijing (CN); Chao Wei, Beijing (CN); Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 357 days.

(21) Appl. No.: 17/780,858

(22) PCT Filed: Dec. 21, 2020

(86) PCT No.: PCT/CN2020/137924
§ 371 (c)(1),
(2) Date: May 27, 2022

(87) PCT Pub. No.: WO2021/129558
PCT Pub. Date: Jul. 1, 2021

(65) Prior Publication Data
US 2023/0015843 A1     Jan. 19, 2023

(30) Foreign Application Priority Data
Dec. 24, 2019   (WO) ................ PCT/CN2019/127750

(51) Int. Cl.
*H04W 74/08*   (2024.01)
*H04W 74/0833*   (2024.01)
(52) U.S. Cl.
CPC ... *H04W 74/0891* (2013.01); *H04W 74/0833* (2013.01)

(58) Field of Classification Search
CPC ............. H04W 74/0891; H04W 74/08; H04W 74/0833; H04W 56/001
See application file for complete search history.

(56) References Cited

U.S. PATENT DOCUMENTS 12,021,626 B2 *   6/2024   Ying ..................... H04W 72/23
2018/0176949 A1   6/2018   Islam et al.
(Continued)

FOREIGN PATENT DOCUMENTS

| CN | 108419300 A | 8/2018 |
| CN | 109041593 A | 12/2018 |

(Continued)

OTHER PUBLICATIONS

Intel Corporation: "Enhancements to Initial Access and Mobility for NR-Unicensed", 3GPP TSG RAN WG1 Meeting #99, R1-1913291, Reno, USA, Nov. 18, 2019-Nov. 22, 2019, 11 Pages, Nov. 22, 2019 (Nov. 22, 2019) the whoie document.

(Continued)

*Primary Examiner* — Mohamed A Kamara
(74) *Attorney, Agent, or Firm* — Holland & Hart LLP

(57) ABSTRACT

Methods, systems, and devices are described for transmitting multiple repetitions of a random access shared channel message in multiple slots using beamformed wireless communications. A UE may determine transmission slots for one or more of the multiple repetitions of a random access shared channel message based on slots associated with random access occasions (ROs) that are mapped to an identified synchronization signal block (SSB), such as a SSB associated with a beam that is selected for communications by the UE. In cases where slots with ROs mapped to the identified SSB are not consecutively located, one or more slot offsets may be provided for transmitting the multiple repetitions of the random access shared channel message. Slot offsets may be explicitly indicated by a base station in a random access (Continued)

response message, or may be determined by the UE based on a mapping of SSBs to ROs.

30 Claims, 24 Drawing Sheets

(56) References Cited

U.S. PATENT DOCUMENTS

| | | | |
|---|---|---|---|
| 2019/0150190 | A1 | 5/2019 | Kim et al. |
| 2019/0296809 | A1 | 9/2019 | Li et al. |
| 2019/0387546 | A1 | 12/2019 | Li et al. |
| 2022/0039136 | A1* | 2/2022 | Takeda ................ H04W 72/23 |

FOREIGN PATENT DOCUMENTS

| | | |
|---|---|---|
| CN | 110035536 A | 7/2019 |
| CN | 110475374 A | 11/2019 |
| CN | 110574479 A | 12/2019 |
| CN | 110574483 A | 12/2019 |
| WO | WO-2018031291 A1 | 2/2018 |
| WO | WO-2018203673 A1 | 11/2018 |
| WO | WO-2019082152 A1 | 5/2019 |
| WO | WO-2019104299 A1 | 5/2019 |
| WO | WO-2019139407 A1 | 7/2019 |
| WO | WO-2019158686 A1 | 8/2019 |

OTHER PUBLICATIONS

International Search Report and Written Opinion—PCT/CN2020/137924—ISA/EPO—Mar. 23, 2021.
International Search Report and Written Opinion—PCT/CN2019/127750—ISA/EPO—Sep. 16, 2020.
NTT Docomo Inc: "Enhancements to Initial Access Procedure for NR-U", 3GPP TSG RAN WG1 #98bis, R1-1911161, Chongqing, China, Oct. 14, 2019-Oct. 20, 2019, pp. 1-10, Oct. 20, 2019 (Oct. 20, 2019) the whole document.
Qualcomm Incorporated: "Summary of Remaining Details on RACH Procedure", 3GPP TSG-RAN WG1 93, R1-1807747, Busan, Korea, May 21, 2018-May 25, 2018, 31 Pages, May 25, 2018 (May 25, 2018) section 7.
Ericsson: "Remaining Details of RACH Procedure", 3GPP TSG-RAN WG1 Meeting #93, R1-1806425, 3rd Generation Partnership Project, Mobile Competence Centre, 650, Route Des Lucioles, F-06921 Sophia-Antipolis Cedex, France, vol. RAN WG1, No. Busan, Korea, May 21, 2018 May 25, 2018, May 11, 2018, pp. 1-10, XP051461845, para[02 .1], [02. 2].
Samsung: "Random Access Procedure in NR", 3GPP TSG-RAN WG2 Meeting #94, R2-163372_Random Access Procedure in NR, 3rd Generation Partnership Project, Mobile Competence Centre, 650, Route Des Lucioles, F-06921 Sophia-Antipolis Cedex, France, vol. RAN WG2, No. Nanjing, China, May 23, 2016-May 27, 2016, May 22, 2016, XP051104903, 7 Pages, pp. 1-4, Figures 1, 4, para [02.1], [2.2.2].
Supplementary European Search Report—EP20906054—Search Authority—The Hague—Nov. 10, 2023.

* cited by examiner

- ▨ Random Access Request Message (MSG1) 220
- ▓ Random Access Response Message (MSG2) 225
- ▩ Random Access Shared Channel Message (MSG3) 230
- ░ Random Access Contention Resolution Message (MSG4) 235

200

| RAR UL Grant Field 405 | # of Bits 410 |
|---|---|
| Freq. Hopping Flag | 1 |
| MSG3 PUSCH Freq. Resource Allocation | 14 |
| MSG3 PUSCH Time Resource Allocation | 4 |
| MCS | 4 |
| TPC Command for MSG3 PUSCH | 4 |
| CSI Request | Reserved |
| Slot Offset Information | 7 |

400

RANDOM ACCESS MESSAGE REPETITION TECHNIQUES IN BEAMFORMED COMMUNICATIONS

CROSS REFERENCE TO RELATED APPLICATIONS

The present application is a 371 national stage filing of International PCT Application No. PCT/CN2020/137924 by Li et. al., entitled "RANDOM ACCESS MESSAGE REPETITION TECHNIQUES IN BEAMFORMED COMMUNICATIONS," filed Dec. 21, 2020; and claims priority to International Patent Application No. PCT/CN2019/127750 by Li et. al., entitled "RANDOM ACCESS MESSAGE REPETITION TECHNIQUES IN BEAMFORMED COMMUNICATIONS," filed Dec. 24, 2019, each of which is assigned to the assignee hereof, and each of which is expressly incorporated by reference in its entirety herein.

TECHNICAL FIELD

The following relates generally to wireless communications and more specifically to random access message repetition techniques in beamformed communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may perform a random access procedure during initial access to connect to a base station. In such procedures, the UE may receive synchronization signals from a base station and identify a random access occasion (RO) based on the synchronization signals. In a four-step random access procedure, the UE may then transmit a random access preamble sequence during the RO (e.g., in a random access channel (RACH) message-1 (MSG1) transmission), and receive a random access response (RAR) from the base station (e.g., in a RACH message-2 (MSG2) transmission). Following the RAR, in some cases the UE may transmit a random access shared channel message (e.g., in a RACH message-3 (MSG3) transmission), and the base station may transmit a contention resolution message (e.g., in a RACH message-4 (MSG4) transmission). Techniques to enhance reliability and efficiency of performing random access procedures are desirable.

SUMMARY

The described techniques relate to improved methods, systems, devices, and apparatuses that support random access message repetition techniques in beamformed communications. In various aspects, multiple repetitions of random access shared channel messages (e.g., RACH MSG3 transmissions) may be transmitted by a user equipment (UE) to enhance the likelihood of successful receipt and decoding by a base station. Such techniques may be used, for example, by NR-light devices (e.g., smart devices, wearable devices, smart sensors) that may be configured to transmit with a reduced transmit power, fewer transmit antennas, or combinations thereof, compared to non-NR-light devices. Providing multiple repetitions of transmissions on such devices may thus improve the likelihood of a base station receiving and successfully decoding the transmissions. As described herein, repetitions may be referred to as transmitting the random access shared channel message multiple times, where a repetition may be referred to as one transmission of the random access shared channel message of the multiple transmissions (repeated transmissions).

In some cases, the multiple repetitions of the random access shared channel messages may be transmitted in a beamformed communication to the base station, where the beamformed communication has a beam direction that is associated with a first synchronization signal block (SSB) that is mapped to a random access occasion (RO) in which the random access request is transmitted. In various aspects, transmission slots for one or more of the multiple repetitions of a random access shared channel message may be determined based on slots associated with ROs that are mapped to the first SSB. In cases where such slots are not consecutively located, one or more slot offsets may be provided for modifying transmission of one or more of the repetitions. In some cases, a UE may determine the slot offset and may postpone transmission of a repetition of the random access shared channel message for slots that are associated with one or more ROs that are each associated with one or more respective SSBs that are different than the first SSB, and where the slot is unassociated with the first RO and the first SSB. In some cases, an indication of the slot offset(s) may be provided by the base station in a random access response (e.g., in a MSG2). In other cases, the UE may determine the slot offset(s) based on one or more mappings between ROs and SSBs. In further cases, a combination of a slot offset indication provided by the base station and a determination of the slot offset at the UE may be used to determine slot offsets for one or more repetitions.

A method of wireless communication at a UE is described. The method may include identifying a random access shared channel message that is to be transmitted to a base station, where the random access shared channel message is associated with a first SSB and a first RO, and where two or more repetitions of the random access shared channel message are to be transmitted in two or more slots, transmitting a first repetition of the random access shared channel message in a first slot that is associated with the first RO, determining that a second slot available for transmission of a second repetition of the random access shared channel message is associated with one or more ROs that are each associated with one or more respective SSBs that are different than the first SSB, and that the second slot is unassociated with the first RO and the first SSB, and modifying, based on the determining, the transmission of the second repetition of the random access shared channel message.

An apparatus for wireless communication at a UE is described. The apparatus may include at least one processor, memory coupled (e.g., operatively, communicatively, functionally, electronically, or electrically) to the at least one processor, and instructions stored in the memory. The instructions may be executable by the at least one processor to cause the apparatus to identify a random access shared channel message that is to be transmitted to a base station, where the random access shared channel message is associated with a first SSB and a first RO, and where two or more repetitions of the random access shared channel message are to be transmitted in two or more slots, transmit a first repetition of the random access shared channel message in a first slot that is associated with the first RO, determine that a second slot available for transmission of a second repetition of the random access shared channel message is associated with one or more ROs that are each associated with one or more respective SSBs that are different than the first SSB, and that the second slot is unassociated with the first RO and the first SSB, and modify, based on the determining, the transmission of the second repetition of the random access shared channel message.

Another apparatus for wireless communication at a UE is described. The apparatus may include means for identifying a random access shared channel message that is to be transmitted to a base station, where the random access shared channel message is associated with a first SSB and a first RO, and where two or more repetitions of the random access shared channel message are to be transmitted in two or more slots, transmitting a first repetition of the random access shared channel message in a first slot that is associated with the first RO, determining that a second slot available for transmission of a second repetition of the random access shared channel message is associated with one or more ROs that are each associated with one or more respective SSBs that are different than the first SSB, and that the second slot is unassociated with the first RO and the first SSB, and modifying, based on the determining, the transmission of the second repetition of the random access shared channel message.

A non-transitory computer-readable medium storing code for wireless communication at a UE is described. The code may include instructions executable by at least one processor to identify a random access shared channel message that is to be transmitted to a base station, where the random access shared channel message is associated with a first SSB and a first RO, and where two or more repetitions of the random access shared channel message are to be transmitted in two or more slots, transmit a first repetition of the random access shared channel message in a first slot that is associated with the first RO, determine that a second slot available for transmission of a second repetition of the random access shared channel message is associated with one or more ROs that are each associated with one or more respective SSBs that are different than the first SSB, and that the second slot is unassociated with the first RO and the first SSB, and modify, based on the determining, the transmission of the second repetition of the random access shared channel message.

In some examples of the method, apparatuses, and non-transitory computer-readable medium described herein, the first slot is determined based on a prior slot that includes a random access response message from the base station that schedules the random access shared channel message, and where the first slot is a predetermined number of slots following the prior slot that includes a random access response message.

In some examples of the method, apparatuses, and non-transitory computer-readable medium described herein, the modifying may include operations, features, means, or instructions for postponing the transmission of the second repetition of the random access shared channel message in the second slot, identifying a third slot subsequent to the second slot, where the third slot may be a closest available slot that may be associated with a RO that is associated with the first SSB, and transmitting the second repetition of the random access shared channel message in the third slot. Some examples of the method, apparatuses, and non-transitory computer-readable medium described herein may further include operations, features, means, or instructions for postponing, based on the postponing of the second repetition of the random access shared channel message, a transmission of a third repetition of the random access shared channel message until a fourth slot subsequent to the third slot, where the fourth slot may be a closest available slot that is associated with a RO that is associated with the first SSB. Some examples of the method, apparatuses, and non-transitory computer-readable medium described herein may further include operations, features, means, or instructions for determining that a fourth slot available for transmission of a third repetition of the random access shared channel message is associated with one or more ROs that are each associated with one or more respective SSBs that are different than the first SSB, and that the fourth slot is unassociated with the first RO and the first SSB, and postponing, based on the determining, the transmission of the third repetition of the random access shared channel message until a fifth slot subsequent to the fourth slot, where the fifth slot is a closest available slot that is associated with a RO that is associated with the first SSB.

In some examples of the method, apparatuses, and non-transitory computer-readable medium described herein, the determining may be based on one or more SSB to RO preamble associations provided in a RMSI communication of the base station. In some examples of the method, apparatuses, and non-transitory computer-readable medium described herein, the modifying may include operations, features, means, or instructions for dropping the second repetition associated with the second slot. In some examples of the method, apparatuses, and non-transitory computer-readable medium described herein, the modifying may include operations, features, means, or instructions for determining a transmission power of one or more repetitions of the random access shared channel message, where the transmission power may be increased relative to another transmission power in the first slot.

Some examples of the method, apparatuses, and non-transitory computer-readable medium described herein may further include operations, features, means, or instructions for receiving, from the base station, a slot offset indication in a random access response message, and where the determining is based on the slot offset indication. In some examples of the method, apparatuses, and non-transitory computer-readable medium described herein, slot offsets for transmitting repetitions of the random access shared channel message may be partitioned into two or more bits associated with respective two or more groups of random access shared channel message slots, and where a value of each of the two or more bits is determined based on whether any slot in the associated group of slots is associated with one or more ROs that are associated with one or more respective SSBs that are different than the first SSB and not associated with the first RO or the first SSB.

In some examples of the method, apparatuses, and non-transitory computer-readable medium described herein, the first slot may be determined from a first group of the two or more groups of random access shared channel message slots based on a prior slot that includes a random access response message from the base station that schedules the random access shared channel message, and where the first slot is a predetermined number of slots following the prior slot that includes a random access response message.

Some examples of the method, apparatuses, and non-transitory computer-readable medium described herein may further include operations, features, means, or instructions for postponing the transmission of the second repetition of the random access shared channel message in a second slot of the first group based on the second slot of the first group being associated with one or more ROs that are each associated with one or more respective SSBs that are different than the first SSB, and the second slot being unassociated with the first RO and the first SSB, identifying a third slot of the first group that is subsequent to the second slot of the first group, where the third slot of the first group is a closest available slot that is associated with a RO that is associated with the first SSB, and transmitting the second repetition of the random access shared channel message in the third slot of the first group.

A method of wireless communication at a UE is described. The method may include receiving, responsive to a random access procedure initiated by the UE that is associated with a first RO and a first SSB, a random access response message from a base station that includes a slot offset indication for a number of slots associated with a number of random access shared channel message repetitions scheduled by the random access response message, transmitting, based on the random access response message, a first repetition of a random access shared channel message in a first slot that is associated with the first RO, determining a slot offset for transmitting a second repetition of the random access shared channel message based on the slot offset indication, and transmitting the second repetition of the random access shared channel message based on the determining.

An apparatus for wireless communication at a UE is described. The apparatus may include at least one processor, memory coupled (e.g., operatively, communicatively, functionally, electronically, or electrically) to the at least one processor, and instructions stored in the memory. The instructions may be executable by the at least one processor to cause the apparatus to receive, responsive to a random access procedure initiated by the UE that is associated with a first RO and a first SSB, a random access response message from a base station that includes a slot offset indication for a number of slots associated with a number of random access shared channel message repetitions scheduled by the random access response message, transmit, based on the random access response message, a first repetition of a random access shared channel message in a first slot that is associated with the first RO, determine a slot offset for transmitting a second repetition of the random access shared channel message based on the slot offset indication, and transmit the second repetition of the random access shared channel message based on the determining.

Another apparatus for wireless communication at a UE is described. The apparatus may include means for receiving, responsive to a random access procedure initiated by the UE that is associated with a first RO and a first SSB, a random access response message from a base station that includes a slot offset indication for a number of slots associated with a number of random access shared channel message repetitions scheduled by the random access response message, transmitting, based on the random access response message, a first repetition of a random access shared channel message in a first slot that is associated with the first RO, determining a slot offset for transmitting a second repetition of the random access shared channel message based on the slot offset indication, and transmitting the second repetition of the random access shared channel message based on the determining.

A non-transitory computer-readable medium storing code for wireless communication at a UE is described. The code may include instructions executable by at least one processor to receive, responsive to a random access procedure initiated by the UE that is associated with a first RO and a first SSB, a random access response message from a base station that includes a slot offset indication for a number of slots associated with a number of random access shared channel message repetitions scheduled by the random access response message, transmit, based on the random access response message, a first repetition of a random access shared channel message in a first slot that is associated with the first RO, determine a slot offset for transmitting a second repetition of the random access shared channel message based on the slot offset indication, and transmit the second repetition of the random access shared channel message based on the determining.

In some examples of the method, apparatuses, and non-transitory computer-readable medium described herein, the slot offset indication provides a slot offset value from zero to a positive integer, for each random access shared channel message repetition of the random access shared channel message repetitions subsequent to the first random access shared channel message. Some examples of the method, apparatuses, and non-transitory computer-readable medium described herein may further include operations, features, means, or instructions for receiving, from the base station, system information that indicates a mapping between possible slot offset values and a number of offset slots. In some examples of the method, apparatuses, and non-transitory computer-readable medium described herein, the slot offset indication may be included in a prespecified number of bits in the random access response message.

In some examples of the method, apparatuses, and non-transitory computer-readable medium described herein, slot offsets for transmitting repetitions of the random access shared channel message may be partitioned into two or more bits associated with respective two or more groups of random access shared channel message slots, and where a value of each of the two or more bits is determined based on whether any slot in the associated group of slots is associated with one or more ROs that are associated with one or more respective SSBs that are different than the first SSB and not associated with the first RO or the first SSB. In some examples of the method, apparatuses, and non-transitory computer-readable medium described herein, the first slot may be determined from a first group of the two or more groups of random access shared channel message slots based on a prior slot that includes a random access response message from the base station that schedules the random access shared channel message, and where the first slot is a predetermined number of slots following the prior slot that includes a random access response message.

Some examples of the method, apparatuses, and non-transitory computer-readable medium described herein may further include operations, features, means, or instructions for postponing the transmission of the second repetition of the random access shared channel message in a second slot of the first group based on the second slot of the first group being associated with one or more ROs that are each associated with one or more respective SSBs that are different than the first SSB, and the second slot being unassociated with the first RO and the first SSB, identifying a third slot of the first group that is subsequent to the second slot of the first group, where the third slot of the first group is a closest available slot that is associated with a RO that is associated with the first SSB, and transmitting the second repetition of the random access shared channel message in the third slot of the first group.

A method of wireless communication at a base station is described. The method may include initiating a random access procedure with a UE, where the random access procedure includes a random access shared channel message that is to be transmitted by the UE, where the random access shared channel message is associated with a first SSB and a first RO, and where two or more repetitions of the random access shared channel message are to be transmitted in two or more slots, receiving, from the UE, a first repetition of the random access shared channel message in a first slot that is associated with the first RO, determining that a second slot available for transmission of a second repetition of the random access shared channel message is associated with one or more ROs that are each associated with one or more respective SSBs that are different than the first SSB, and that the second slot is unassociated with the first RO and the first SSB, and monitoring, based on the determining, for the second repetition of the random access shared channel message in a subsequent RO after the second slot.

An apparatus for wireless communication at a base station is described. The apparatus may include at least one processor, memory coupled (e.g., operatively, communicatively, functionally, electronically, or electrically) to the at least one processor, and instructions stored in the memory. The instructions may be executable by the a least one processor to cause the apparatus to initiate a random access procedure with a UE, where the random access procedure includes a random access shared channel message that is to be transmitted by the UE, where the random access shared channel message is associated with a first SSB and a first RO, and where two or more repetitions of the random access shared channel message are to be transmitted in two or more slots, receive, from the UE, a first repetition of the random access shared channel message in a first slot that is associated with the first RO, determine that a second slot available for transmission of a second repetition of the random access shared channel message is associated with one or more ROs that are each associated with one or more respective SSBs that are different than the first SSB, and that the second slot is unassociated with the first RO and the first SSB, and monitor, based on the determining, for the second repetition of the random access shared channel message in a subsequent RO after the second slot.

Another apparatus for wireless communication at a base station is described. The apparatus may include means for initiating a random access procedure with a UE, where the random access procedure includes a random access shared channel message that is to be transmitted by the UE, where the random access shared channel message is associated with a first SSB and a first RO, and where two or more repetitions of the random access shared channel message are to be transmitted in two or more slots, receiving, from the UE, a first repetition of the random access shared channel message in a first slot that is associated with the first RO, determining that a second slot available for transmission of a second repetition of the random access shared channel message is associated with one or more ROs that are each associated with one or more respective SSBs that are different than the first SSB, and that the second slot is unassociated with the first RO and the first SSB, and monitoring, based on the determining, for the second repetition of the random access shared channel message in a subsequent RO after the second slot.

A non-transitory computer-readable medium storing code for wireless communication at a base station is described. The code may include instructions executable by at least one processor to initiate a random access procedure with a UE, where the random access procedure includes a random access shared channel message that is to be transmitted by the UE, where the random access shared channel message is associated with a first SSB and a first RO, and where two or more repetitions of the random access shared channel message are to be transmitted in two or more slots, receive, from the UE, a first repetition of the random access shared channel message in a first slot that is associated with the first RO, determine that a second slot available for transmission of a second repetition of the random access shared channel message is associated with one or more ROs that are each associated with one or more respective SSBs that are different than the first SSB, and that the second slot is unassociated with the first RO and the first SSB, and monitor, based on the determining, for the second repetition of the random access shared channel message in a subsequent RO after the second slot.

In some examples of the method, apparatuses, and non-transitory computer-readable medium described herein, the first slot may be determined based on a prior slot that includes a random access response message from the base station that schedules the random access shared channel message, and where the first slot is a predetermined number of slots following the prior slot that includes a random access response message.

In some examples of the method, apparatuses, and non-transitory computer-readable medium described herein, the monitoring may include operations, features, means, or instructions for postponing the monitoring for the second repetition of the random access shared channel message in the second slot, identifying a third slot subsequent to the second slot, where the third slot is a closest available slot that is associated with a RO that is associated with the first SSB, and monitoring for the second repetition of the random access shared channel message in the third slot. Some examples of the method, apparatuses, and non-transitory computer-readable medium described herein may further include operations, features, means, or instructions for postponing, based on the postponing of monitoring for the second repetition of the random access shared channel message, monitoring for a third repetition of the random access shared channel message until a fourth slot subsequent to the third slot, where the fourth slot is a closest available slot that is associated with a RO that is associated with the first SSB.

Some examples of the method, apparatuses, and non-transitory computer-readable medium described herein may further include operations, features, means, or instructions for determining that a fourth slot available for transmission of a third repetition of the random access shared channel message is associated with one or more ROs that are each associated with one or more respective SSBs that are different than the first SSB, and that the fourth slot is unassociated with the first RO and the first SSB, and postponing, based on the determining, monitoring for the third repetition of the random access shared channel message until a fifth slot subsequent to the fourth slot, where the fifth slot is a closest available slot that is associated with a RO that is associated with the first SSB. In some examples of the method, apparatuses, and non-transitory computer-readable medium described herein, the determining is based on one or more SSB-to-RO preamble associations provided in a RMSI communication of the base station.

In some examples of the method, apparatuses, and non-transitory computer-readable medium described herein, the second repetition associated with the second slot may be dropped. In some examples of the method, apparatuses, and non-transitory computer-readable medium described herein, a transmission power of one or more repetitions of the random access shared channel message may be increased relative to another transmission power in the first slot.

Some examples of the method, apparatuses, and non-transitory computer-readable medium described herein may further include operations, features, means, or instructions for transmitting, to the UE, a slot offset indication in a random access response message, and where the determining is based on the slot offset indication. In some examples of the method, apparatuses, and non-transitory computer-readable medium described herein, slot offsets for transmitting repetitions of the random access shared channel message may be partitioned into two or more bits associated with respective two or more groups of random access shared channel message slots, and where a value of each of the two or more bits is determined based on whether any slot in the associated group of slots is associated with one or more ROs that are associated with one or more respective SSBs that are different than the first SSB and not associated with the first RO or the first SSB. In some examples of the method, apparatuses, and non-transitory computer-readable medium described herein, the first slot may be determined from a first group of the two or more groups of random access shared channel message slots based on a prior slot that includes a random access response message from the base station that schedules the random access shared channel message, and where the first slot is a predetermined number of slots following the prior slot that includes a random access response message.

Some examples of the method, apparatuses, and non-transitory computer-readable medium described herein may further include operations, features, means, or instructions for postponing the monitoring for the second repetition of the random access shared channel message in a second slot of the first group based on the second slot of the first group being associated with one or more ROs that are each associated with one or more respective SSBs that are different than the first SSB, and the second slot being unassociated with the first RO and the first SSB, identifying a third slot of the first group that is subsequent to the second slot of the first group, where the third slot of the first group is a closest available slot that is associated with a RO that is associated with the first SSB, and monitoring for the second repetition of the random access shared channel message in the third slot of the first group.

A method of wireless communication at a base station is described. The method may include transmitting, responsive to a random access procedure initiated by a UE that is associated with a first RO and a first SSB, a random access response message to the UE that includes a slot offset indication for a number of slots associated with a number of random access shared channel message repetitions scheduled by the random access response message, receiving, based on the random access response message, a first repetition of a random access shared channel message in a first slot that is associated with the first RO, determining a slot offset for receiving a second repetition of the random access shared channel message based on the slot offset indication, and receiving the second repetition of the random access shared channel message based on the determining.

An apparatus for wireless communication at a base station is described. The apparatus may include at least one processor, memory coupled (e.g., operatively, communicatively, functionally, electronically, or electrically) to the at least one processor, and instructions stored in the memory. The instructions may be executable by the at least one processor to cause the apparatus to transmit, responsive to a random access procedure initiated by a UE that is associated with a first RO and a first SSB, a random access response message to the UE that includes a slot offset indication for a number of slots associated with a number of random access shared channel message repetitions scheduled by the random access response message, receive, based on the random access response message, a first repetition of a random access shared channel message in a first slot that is associated with the first RO, determine a slot offset for receiving a second repetition of the random access shared channel message based on the slot offset indication, and receive the second repetition of the random access shared channel message based on the determining.

Another apparatus for wireless communication at a base station is described. The apparatus may include means for transmitting, responsive to a random access procedure initiated by a UE that is associated with a first RO and a first SSB, a random access response message to the UE that includes a slot offset indication for a number of slots associated with a number of random access shared channel message repetitions scheduled by the random access response message, receiving, based on the random access response message, a first repetition of a random access shared channel message in a first slot that is associated with the first RO, determining a slot offset for receiving a second repetition of the random access shared channel message based on the slot offset indication, and receiving the second repetition of the random access shared channel message based on the determining.

A non-transitory computer-readable medium storing code for wireless communication at a base station is described. The code may include instructions executable by at least one processor to transmit, responsive to a random access procedure initiated by a UE that is associated with a first RO and a first SSB, a random access response message to the UE that includes a slot offset indication for a number of slots associated with a number of random access shared channel message repetitions scheduled by the random access response message, receive, based on the random access response message, a first repetition of a random access shared channel message in a first slot that is associated with the first RO, determine a slot offset for receiving a second repetition of the random access shared channel message based on the slot offset indication, and receive the second repetition of the random access shared channel message based on the determining.

In some examples of the method, apparatuses, and non-transitory computer-readable medium described herein, the slot offset indication provides a slot offset value from zero to a positive integer, for each random access shared channel message repetition of the random access shared channel message repetitions subsequent to the first random access shared channel message. Some examples of the method, apparatuses, and non-transitory computer-readable medium described herein may further include operations, features, means, or instructions for transmitting, to the UE, system information that indicates a mapping between possible slot offset values and a number of offset slots. In some examples of the method, apparatuses, and non-transitory computer-readable medium described herein, the slot offset indication may be included in a prespecified number of bits in the random access response message.

In some examples of the method, apparatuses, and non-transitory computer-readable medium described herein, slot offsets for transmitting repetitions of the random access shared channel message may be partitioned into two or more bits associated with respective two or more groups of random access shared channel message slots, and where a value of each of the two or more bits is determined based on whether any slot in the associated group of slots is associated with one or more ROs that are associated with one or more respective SSBs that are different than the first SSB and not associated with the first RO or the first SSB. In some examples of the method, apparatuses, and non-transitory computer-readable medium described herein, the first slot may be determined from a first group of the two or more groups of random access shared channel message slots based on a prior slot that includes a random access response message from the base station that schedules the random access shared channel message, and where the first slot is a predetermined number of slots following the prior slot that includes a random access response message.

Some examples of the method, apparatuses, and non-transitory computer-readable medium described herein may further include operations, features, means, or instructions for postponing the receiving of the second repetition of the random access shared channel message in a second slot of the first group based on the second slot of the first group being associated with one or more ROs that are each associated with one or more respective SSBs that are different than the first SSB, and the second slot being unassociated with the first RO and the first SSB, identifying a third slot of the first group that is subsequent to the second slot of the first group, where the third slot of the first group is a closest available slot that is associated with a RO that is associated with the first SSB, and receiving the second repetition of the random access shared channel message in the third slot of the first group.

DETAILED DESCRIPTION

Figure 1:
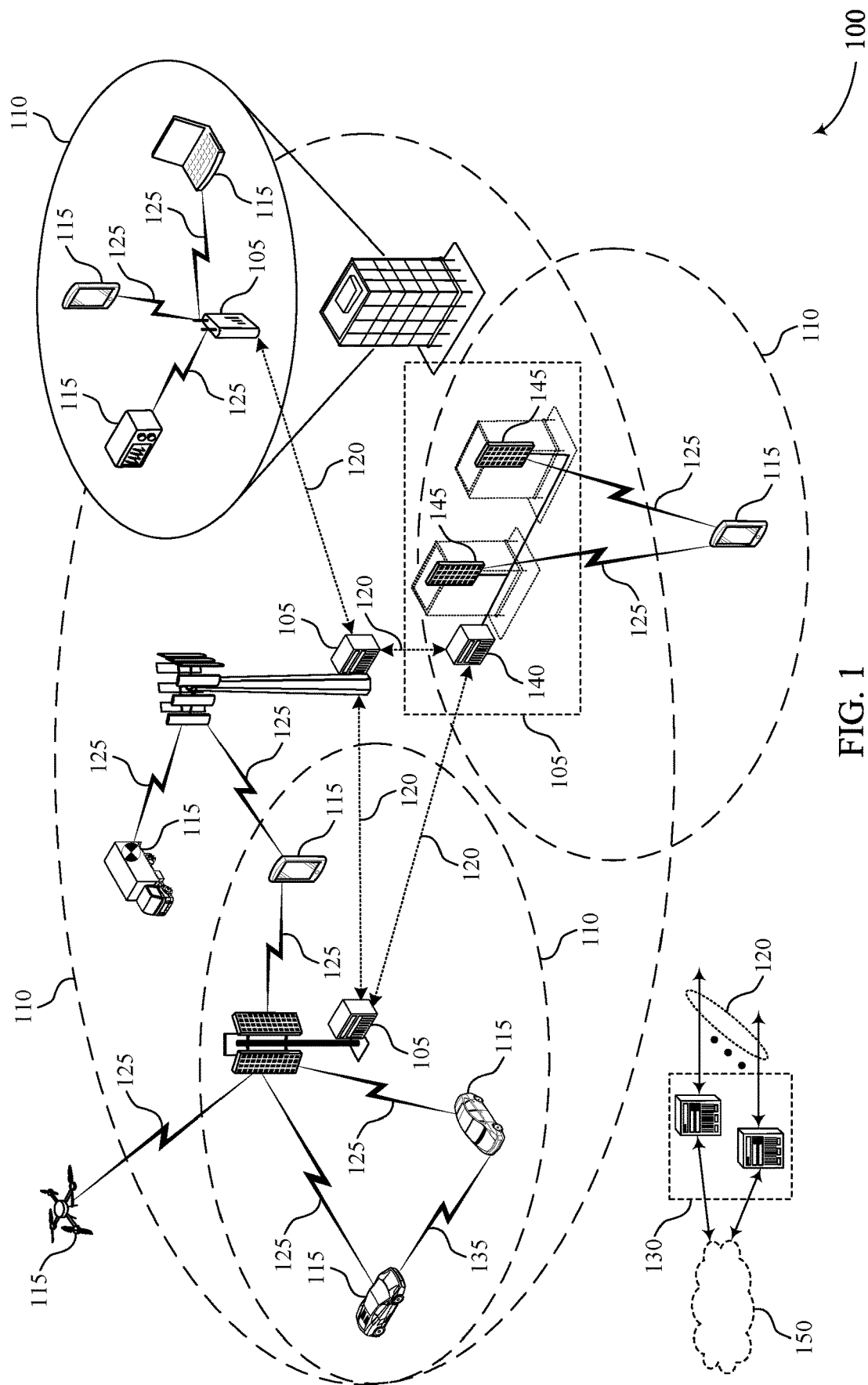
FIGS. 1 and 2 illustrate examples of wireless communications systems that support random access message repetition techniques in beamformed communications in accordance with aspects of the present disclosure.

Some wireless communications systems may support NR-light devices. NR-light devices, such as smart devices, wearable devices, or smart sensors, may communicate with a base station and operate in the same cell as other, non-NR-light devices, such as mobile broadband (MBB) devices. A NR-light device may also be referred to as a low-tier device for which premium features may not be needed or useful. For example, premium New Radio (NR) services may include ultra-reliable low-latency communications (URLLC) devices or enhanced mobile broadband (eMBB) devices. Low tier devices in Long Term Evolution (LTE) wireless systems included low power wide area (LPWA) devices or massive machine type communications (mMTC) devices. While a NR-light device may encompass LPWA and mMTC devices, a NR-light device also may include sensors (for example, industrial sensors), cameras (for example, video monitoring devices), wearables, and low tier or relaxed Internet of Things (IoT) devices. NR-light devices may be used in a variety of applications, including healthcare, smart cities, transportation and logistics, electricity distribution, process automation, and building automation, just to name a few. As an example, a NR-light device may have a latency requirement of 10-30 ms, and a reliability requirement of a NR-light device may be in the order of $10^{-3}$, $10^{-4}$, or $10^{-5}$. The data rate of a NR-light device may be 10 Mbps and lower, for example.

A NR-light user equipment (UE) may be configured to transmit with a reduced transmit power compared to non-NR-light devices. For example, the uplink transmit power of an NR-light UE may be at least 10 dB lower than that of an MBB UE. In some cases, based on the reduced transmit power, NR-light devices may transmit multiple repetitions of uplink signaling. Transmitting multiple repetitions may improve the likelihood of a base station receiving and successfully decoding transmissions from a NR-light UE. For example, a NR-light UE may transmit repetitions of a random access shared channel message of a random access procedure during initial access. Techniques described herein support a UE to identify associations between a received synchronization signal block (SSB) and parameters for transmitting repetitions of a random access shared channel message (e.g., MSG3 repetitions) during a random access procedure.

For example, a UE may measure a number reference signal transmissions in multiple SSBs and identify a first SSB as a preferred SSB for communications with a base station. The UE may decode one or more SSBs and identify information to receive a remaining minimum system information (RMSI) transmission, which may include a system information block (SIB). The UE may receive a SIB (e.g., a SIB1) and identify parameters for a random access procedure. In some cases, the SIB may carry mapping information between SSBs and random access occasions (ROs) (also referred to as random access procedure occasions) for NR-light random access procedures. For example, different SSBs (e.g., with different SSB indices) may be mapped to different ROs, and thus different ROs may have different beams that will be monitored by the base station for random access messages.

The UE may transmit the random access procedure preamble sequence (e.g., a MSG1 or RAR transmission) in ROs corresponding to the first SSB, using the beam associated with the first SSB. The UE may also identify a repetition pattern or repetition scheme for transmitting repetitions of the random access shared channel message (e.g., MSG3 repetitions). In some cases, transmission slots for one or more of the multiple repetitions of the random access shared channel message may be determined based on slots associated with ROs that are mapped to the first SSB. In cases where such slots are not consecutively located (e.g., due to slots that are not associated with a RO that is mapped to the first SSB), one or more slot offsets may be provided for modifying transmission of one or more of the repetitions. In some cases, the UE may determine the slot offset and may postpone transmission of a repetition of the random access shared channel message for one or more slots based on the slot offset. For example the UE may determine that a slot is associated with one or more ROs that are each associated with one or more respective SSBs that are different than the first SSB, and where the slot is unassociated with the first RO and the first SSB. Based on such a determination, the UE may postpone a repetition that would normally be transmitted in that slot, drop the repetition for the slot, or modify a transmission power of the repetition (e.g., to increase the transmission power to enhance the likelihood that the base station receives repetition even though it is transmitted using a different beam than will be monitored by the base station in the RO). In some cases, an indication of the slot offset(s) may be provided to the UE by the base station in a random access response (e.g., in a MSG2). In some cases, the UE may determine the slot offset(s) based on one or more mappings between ROs and SSBs. In further cases, a combination of a slot offset information provided by the base station and a determination of the slot offset at the UE may be used to determine slot offsets for one or more repetitions.

Such techniques may enhance the likelihood of successful reception of the random access shared channel message at the base station, which may thus enhance the efficiency and reliability of the system and also reduce access time for UEs.

In some cases the base station may combine the multiple repetitions and decode the combined repetitions. By providing the repetitions in ROs in which the base station will be using receive beamforming corresponding to a beam used to transmit the repetitions, combining and decoding is more likely to be successful.

Aspects of the disclosure are initially described in the context of wireless communications systems. Several examples of RO to SSB mappings and determinations of slot offsets are then described. Aspects of the disclosure are further illustrated by and described with reference to apparatus diagrams, system diagrams, and flowcharts that relate to random access message repetition techniques in beamformed communications.

FIG. 1 illustrates an example of a wireless communications system 100 that supports random access message repetition techniques in beamformed communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or another interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology). The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023). Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as NR-light, MTC, or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as category M (CAT-M), Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

Some UEs 115 may be examples of NR-light devices, such as smart devices, wearable devices, smart sensors, or NR-light devices may communicate with a base station 105 and operate in the same cell as other, non-NR-light devices, such as mobile broadband (MBB) devices. A NR-light UE 115 may be configured to transmit with a reduced transmit power and may have fewer antennas compared to non-NR-light devices. Based on the reduced transmit power and fewer antennas, NR-light devices may transmit multiple repetitions of uplink signaling. Transmitting multiple repetitions may improve the likelihood of a base station 105 receiving and successfully decoding transmissions from a NR-light UE 115. For example, a NR-light UE 115 may transmit repetitions of a random access shared channel message (e.g., a MSG3 physical uplink shared channel (PUSCH) transmission) of a random access procedure during initial access. Techniques described herein support a UE 115, such as an NR-Light UE 115, to identify associations between identified ROs and SSBs that may determine one or more slot offsets to apply when transmitting repetitions of a random access shared channel message during a random access procedure.

For example, a UE 115 may determine transmission slots for one or more of the multiple repetitions of a random access shared channel message based on slots associated with ROs that are mapped to an identified SSB (e.g., a SSB associated with a beam that is selected for communications by the UE 115). In cases where such slots are not consecutively located, one or more slot offsets may be provided for modifying transmission of one or more of the repetitions. In some cases, a UE 115 may determine the slot offset and may postpone transmission of a repetition of the random access shared channel message for slots that are associated with one or more ROs that are each associated with one or more respective SSBs that are different than the identified SSB, and where the slot is unassociated with an RO that is mapped to the identified SSB. In some cases, an indication of the slot offset(s) may be provided by the base station 105 in a random access response (e.g., in a MSG2). In other cases, the UE 115 may determine the slot offset(s) based on one or more mappings between ROs and SSBs. In further cases, a combination of a slot offset group indication provided by the base station 105 and a determination of the slot offset at the UE 115 may be used to determine slot offsets for one or more repetitions.

Figure 2:
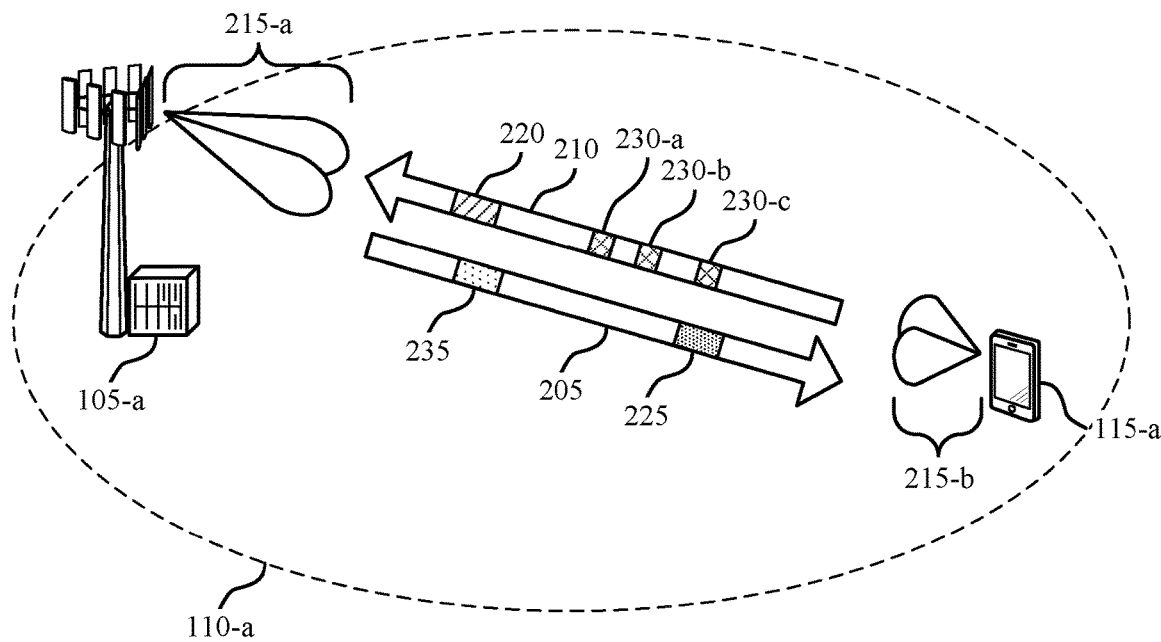

FIG. 2 illustrates an example of a wireless communications system 200 that supports random access message repetition techniques in beamformed communications in accordance with aspects of the present disclosure. In some examples, wireless communications system 200 may implement aspects of wireless communications system 100. The wireless communications system 200 may include a UE 115-a and a base station 105-a, which may be respective examples of a UE 115 and a base station 105.

The base station 105-a and UE 115-a may communicate via downlink communications 205 and uplink communications 210. In some cases, the communications may be beamformed communications, in which the base station 105-a may transmit, to the UE 115-a, on one or more base station beams 215-a, and the UE 115-a may monitor for the transmissions using UE beams 215-b. Similarly, the UE 115-a may transmit, to the base station 105-a, on one or more UE beams 215-b which the base station 105-a may monitor for and receive on the base station beams 215-a.

In some cases, the UE 115-a may perform a random access procedure to attach to the base station 105-a. The UE 115-a may monitor for synchronization signals, transmitted in one or more synchronization signal blocks (SSBs) by the base station 105-a. An SSB may include, for example, a primary synchronization signal (PSS), a secondary synchronization signal (SSS), and two physical broadcast channels (PBCHs). The base station 105-a may transmit a master information block (MIB) in the PBCH, which may carry information for how the UE 115-a can find RMSI and system information blocks (SIBs). A SIB, such as a first SIB or SIB1, may carry information (e.g., parameters) related to random access procedures, in some cases.

Based on the random access parameters, the UE 115-a may transmit a random access request message 220 (e.g., MSG1) to the base station 105-a. The base station 105-a, in response to receiving the random access request message 220, may transmit a random access response message 225 (e.g., MSG2). Following the random access response message 225, the UE 115-a may transmit a random access shared channel message 230 (e.g., MSG3 PUSCH). In some cases, due to the UE 115-a being a NR-light UE, multiple repetitions of the random access shared channel message 230 may be transmitted, including a first repetition 230-a, a second repetition 230-b, and a third repetition 230-c. The base station 105-a may then transmit a random access contention resolution message 235 (e.g., MSG4) to the UE 115-a.

The UE 115-a may determine random access channel parameters based on the parameters carried in SIB1 for the random access request message 230 and the random access shared channel message 230. For example, the UE 115-a may determine a set of preambles to transmit during the random access procedure (e.g., in the MSG1 transmission). In some cases, the UE 115-a may identify up to 64 preambles. The preambles may be determined by a preamble root sequence parameter (e.g., "prach-RootSequenceIndex"), a parameter indicating a set restriction for the preambles (e.g., "restrictedSetConfig"), a zero correlation zone parameter (e.g., "zeroCorrelationZoneConfig"), a parameter indicating a total number of random access preambles ("totalNumberOfRA-Preambles"), or any combination thereof.

The UE 115-a may also determine when to transmit a random access preamble. For example, the UE 115-a may identify random access occasions (ROs) based on the information conveyed in the RMSI/SIB1. In some cases, the UE 115-a may determine which format of random access preamble that the UE 115-a can transmit. The UE 115-a may identify a number of frequency division multiplexed ROs at each RO instance (e.g., in the time domain), which may be determined based on a parameter such as "msg1-FDM." The UE 115-a may also identify a starting frequency of the ROs, which may be determined based on a parameter such as "msg1-FrequencyStart." The UE 115-a may also determine an association between an index of the received SSB and ROs. For example, the UE 115-a may determine how a transmitted preamble or a chosen RO can be associated with an SSB index, such as for beam management. The association may be determined based on an SSB-to-RO association parameter such as "ssb-perRACH-OccasionAndCB-PreamblesPerSSB."

In some cases, the SSB-to-RO association parameter may indicate a number of SSBs per RO. For example, there may be ⅛, ¼, ½, 1, 2, 4, 8, or 16 SSBs per RO. In some examples, the SSB-to-RO association parameter may indicate a number of contention-based random access preambles per SSB. In some cases, the number of contention-based random access preambles per SSB may be based on a number of SSBs per RO. The total number of random access preambles may correspond to the number of contention-based random access preambles per SSB and the number of SSBs per RO.

In some cases, the UE 115-a may be an example of a NR-light device, as discussed herein. For example, the uplink transmit power of a NR-light UE may be at least 10 dB lower than an MBB or eMBB UE. In some cases, NR-light UEs may have a reduced transmit/receive bandwidth. For example, a NR-light UE may be configured with 5 MHz bandwidth or 10 MHz bandwidth, or some amount between, for both transmitting and receiving. A NR-light UE also may use one receive antenna, which may correspond to a lower equivalent receive SNR. In some examples, the NR-light UEs may support generally reduced computation complexity. For example, the NR-light UEs may be low power devices, where increased complexity and processing may lead to higher power usage.

As discussed, based on the reduced transmit power, NR-light devices may repeat uplink transmissions to assist the base station 105-a in successfully detecting and decoding the uplink signals from the UE 115-a. Without transmitting repetitions, base station 105-a may not be able to detect the uplink signaling from the UE 115-a, as the uplink transmissions with lower transmit power may be more susceptible to interference. Based on the lower transmit power of NR-light devices, a NR-light UE may transmit repetitions of the random access shared channel message 230. Techniques described herein support a UE 115 (e.g., a NR-light UE), to identify associations between a received SSB and ROs. For example, the UE 115-a may identify an SSB-to-RO mapping, an association between ROs and transmission slots, a configuration for a repetition scheme to transmit repetitions of the random access shared channel message 230, or any combination thereof. In some cases, the UE 115-a may identify these associations based on interpreting a random access channel configuration for other UEs 115 (e.g., legacy NR UEs or eMBB UEs), which may be signaled in RMSI/SIB1. Examples of SSB-to-RO mappings are discussed with reference to FIGS. 3A through 3C.

In some cases, the base station 105-a may only use a limited number of receive beams associated with a certain subset of SSBs within a single slot. For example, due to analog beamforming implementation, the base station 105-a may not be able to use all receive beams across multiple frequency ranges simultaneously. Further, the random access configuration may provide that the random access shared channel message 230 (e.g., MSG3 PUSCH transmissions) are supposed to be received at the base station 105-a using a same receive beam that is associated with the SSB indicated by the UE in random access request message 220. In cases where multiple repetitions of the random access shared channel message 230 are transmitted, simply transmitting the repetitions in consecutive slots may result in one or more of the repetitions being transmitted using a beam that is not monitored by the base station 105-a in a slot. For example, is a second slot for a second repetition of the random access shared channel message 230 is associated with another SSB different from the SSB indicated by the UE 115-a in the random access request message 220 (e.g., the second slot may be associated with a validated RO corresponding to another SSB different from the one indicated by the UE, according to the RMSI). In accordance with techniques discussed herein, transmission slots for one or more of the multiple repetitions of the random access shared channel message 230 may be determined based on slots associated with ROs that are mapped to the SSB identified by the UE 115-a and used for the random access request message 220.

In cases where such slots are not consecutively located (e.g., due to slots that are not associated with a RO that is mapped to the identified SSB), one or more slot offsets may be provided for modifying transmission of one or more of the repetitions. In some cases, the UE 115-a may determine the slot offset and may postpone transmission of a repetition of the random access shared channel message 230 for one or more slots based on the slot offset, as will be described for some examples with reference to FIGS. 4-7. In some cases, an indication of the slot offset(s) may be provided to the UE 115-a by the base station 105-a in the random access response message 225 (e.g., in MSG2). In some cases, the UE 115-a may determine the slot offset(s) based on one or more mappings between ROs and SSBs, and slots that are associated with one or more ROs. In further cases, a combination of a slot offset information provided by the base station 105-a and a determination of the slot offset at the UE 115-a may be used to determine slot offsets for one or more repetitions. In some cases, the slot offsets may be applied to one or more slots after an initial transmission of the random access shared channel message 230. In some cases, an initial slot for a transmission of a first repetition of the random access shared channel message 230 may be determined based on a predetermined number of slots following the slot used to transmit the random access response message 225, and subsequent slots are then used for following repetitions of the random access shared channel message 230, based on the slot offset(s). In some cases, in an FDD system, multiple repetitions of the random access shared channel message 230 may be transmitted in different frequency bands in a same slot.

Figure 3A:
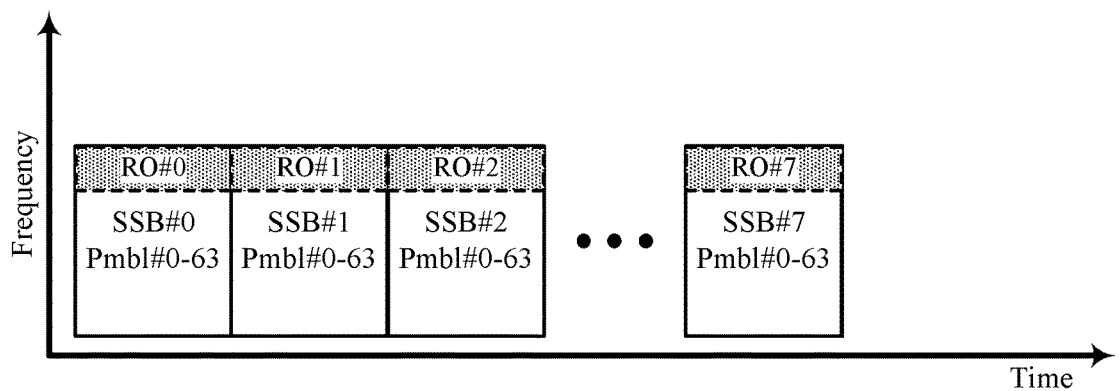
FIGS. 3A through 3C illustrates examples of RO-to-SSB mappings that support random access message repetition techniques in beamformed communications in accordance with aspects of the present disclosure.
Figure 3B:
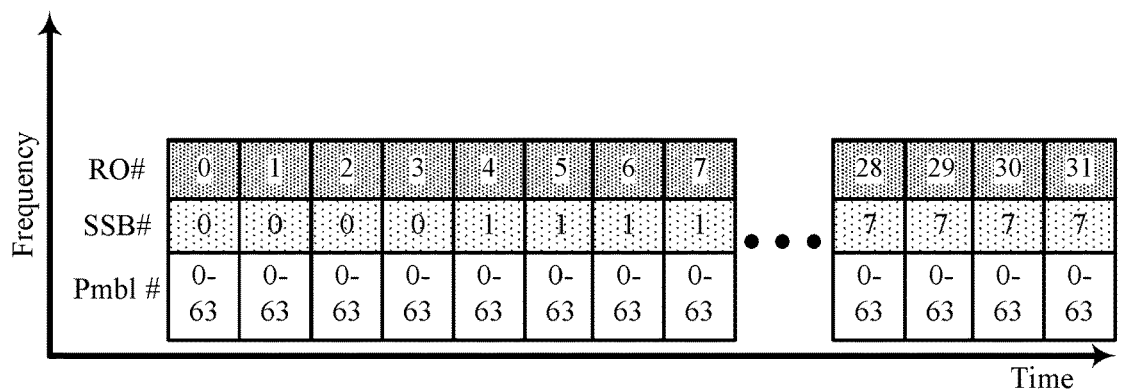
Figure 3C:
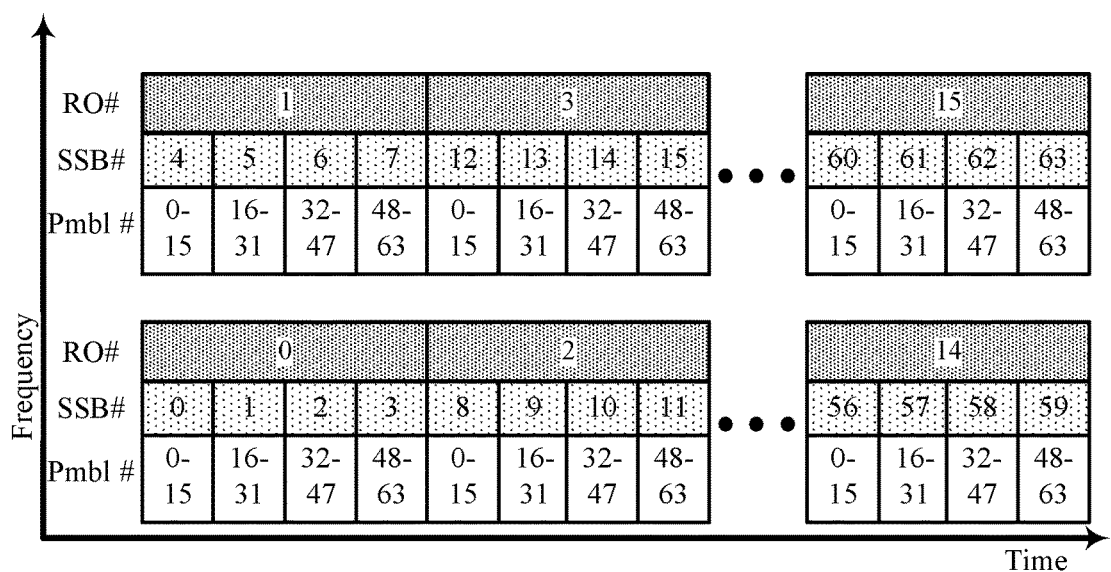

FIGS. 3A through 3C illustrate examples of RO-to-SSB mappings 300, 330, and 360 that support random access message repetition techniques in beamformed communications in accordance with aspects of the present disclosure. In some examples, RO-to-SSB mappings 300, 330, and 360 may implement aspects of wireless communications system 100 or 200. In the example of FIG. 3A, RO-to-SSB mapping 300 may have an FDM index of one, indicating one FDM'ed RO at each time-domain RO instance in each slot, a single SSB per RO, and preambles 0-63 that may be used in each RO. In the example of FIG. 3B, RO-to-SSB mapping 330 may have an FDM index of one, with four ROs per SSB, and preambles 0-63 that may be used in each RO. In the example of FIG. 3C, RO-to-SSB mapping 360 may have an FDM index of two, with SSBs per ROs, and 16 preambles that may be used in each RO. In some cases RO-to-SSB mappings may be provided by a base station in RMSI (e.g., in SIB1). In some cases, one or more ROs may be associated with a particular slot, and the base station may monitor receive beams for a particular slot based on the ROs that are associated with that slot. As discussed with reference to FIG. 2, in cases where a UE is transmitting multiple repetitions of a random access shared channel message using a first beam associated with a first RO and corresponding first SSB, it may be beneficial to account for one or more slots in which there are no ROs associated with the first beam, and thus the base station will not use beamforming parameters associated with the first beam when monitoring the RO for any random access messages from UEs. As discussed herein, one or more slot offsets may be used to modify a repetition (e.g., postponing the repetition, dropping the repetition, or increasing a transmit power for the repetition) for a slot that is not associated with a RO that corresponds to the first beam. In some cases, such as described in the examples of FIGS. 4 and 5, the base station may provide an indication of one or more slot offsets to the UE with a random access response message.

Figure 4:
FIG. 4 illustrates an example of a random access response uplink grant that supports random access message repetition techniques in beamformed communications in accordance with aspects of the present disclosure.

FIG. 4 illustrates an example of a random access response uplink grant 400 that supports random access message repetition techniques in beamformed communications in accordance with aspects of the present disclosure. In some examples, random access response uplink grant 400 may implement aspects of wireless communications system 100 or 200. In some cases, the random access response uplink grant 400 may be transmitted by a base station (e.g., a base station 105 of FIG. 1 or 2) to a UE (e.g., a UE 115 of FIG. 1 or 2) in a random access response message (e.g. a MSG2 transmission).

Figure 5:
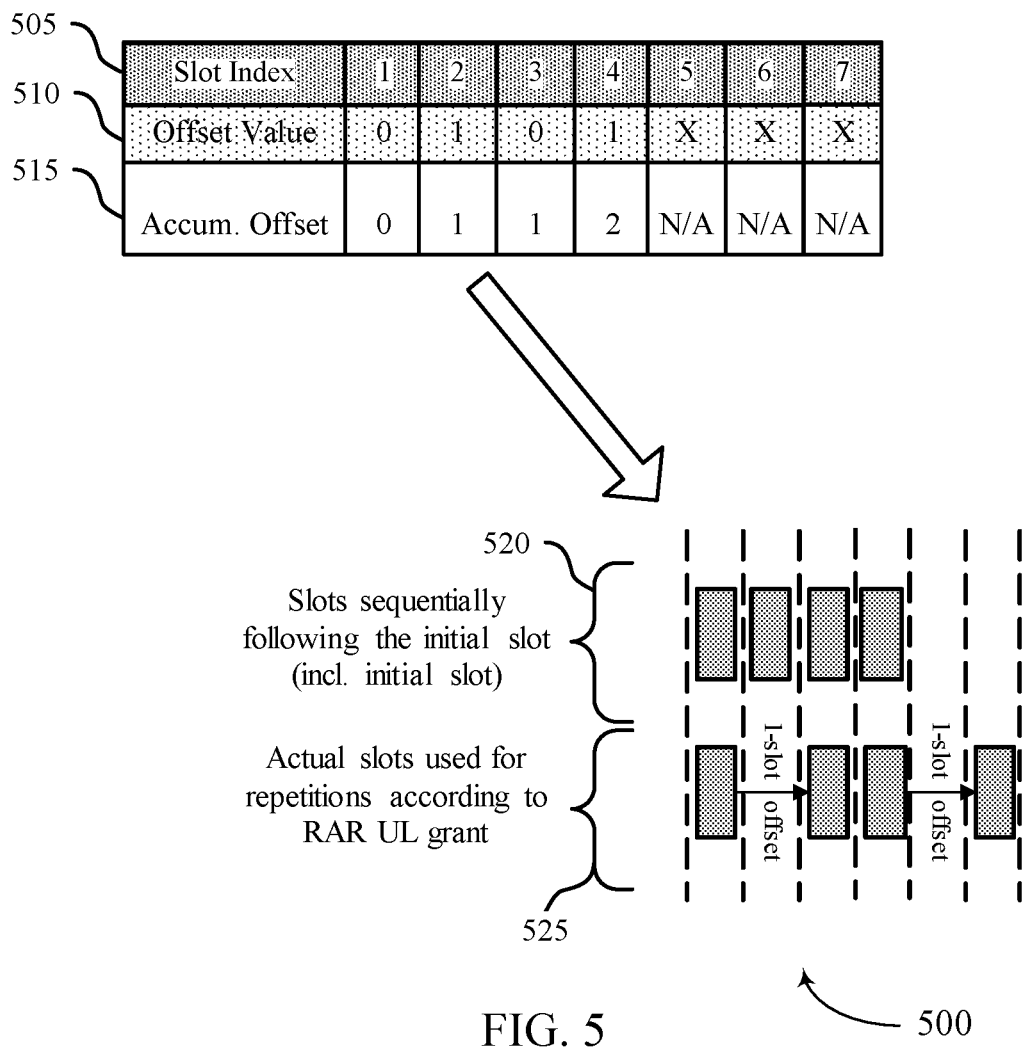
FIG. 5 illustrates an example of a slot offset based on a slot offset indication that supports random access message repetition techniques in beamformed communications in accordance with aspects of the present disclosure.

The random access response uplink grant 400 may include a number of RAR grant fields 405 that each include a number of bits 410. In this example, random access response uplink grant 400 may include a frequency hopping flag 415 that may occupy a single bit, a MSG3 PUSCH frequency resource allocation 420 occupying 14 bits, a MSG3 PUSCH time resource allocation 425 occupying 4 bits, a modulation and coding scheme (MCS) indication 430 occupying 4 bits, a transmit power control (TPC) command for MSG3 PUSCH 435 occupying 4 bits, a channel state information (CSI) request 440 occupying a reserved number of bits, and a slot offset information field 445 that may occupy 7 bits. In this example, the slot offset information field 445 may provide slot offsets for repetitions of random access shared channel messages. In this example, the slot offset information field 445 has seven bits, although more or fewer bits may be used for such a field in other cases. FIG. 5 illustrates an example of a slot offset information field 445 and associated slots that may be used for transmitting repetitions of the random access shared channel messages.

FIG. 5 illustrates an example of a slot offset based on a slot offset indication 500 that supports random access message repetition techniques in beamformed communications in accordance with aspects of the present disclosure. In some examples, slot offset based on a slot offset indication 500 may implement aspects of wireless communications system 100 or 200. In this example, a slot offset information field provides information related to an offset value 510 that has bits corresponding to a slot index 505. In this example, an offset value 510 of zero may indicate that the corresponding slot (e.g., starting at a slot of an initial repetition of the random access shared channel message (MSG3 PSUSCH)) is to have a normal transmission, and an offset value of one may indicate that the corresponding slot is to have a modified transmission, such as a postponed transmission to the next slot (which may again have an offset value of one that indicates the transmission is to be further postponed to the next slot, and so on), dropped, or transmitted at a different transmission power (e.g., an increased transmission power relative to other transmissions of the slot).

In the example of FIG. 5, repetitions are postponed in the event that the offset value associated with a slot has a value of one. Thus, in this case, a number of slots 520 sequentially following the initial slot may have offset values that indicate one or more repetitions are to be postponed. In this example, a second slot may have an offset value of 1, indicating that the repetition of that slot is to be postponed. Further, in this example, the fourth slot may have an offset indication of one, indicating that the repetition of that slot is also to be postponed, and thus an accumulated offset 515 becomes one slot starting at the second slot and increases to two slots starting at the fourth slot. Based on this slot offset indication, the actual slots 525 used for repetitions include a gap at the second and fifth slots, as illustrated.

While FIG. 5 provides one specific example, other examples may be readily available, in which, for the kth repetitions slot, an integer value $t_k=0, 1, 2, \ldots, T$ may be indicated in the RAR uplink grant, interpreted as a number of slots to be postponed comparing to the consecutively allocated slot index. In some cases, the value of T may be configured by the base station, such as via RMSI. In such cases, if $t_k=0$, the UE would not postpone the kth slot, and if $t_k>0$, the UE would postpone the kth slot, as well as the slots after the corresponding slot, with a number of $t_k$ slots. If a certain slot is already postponed due to a previous slot's slot offset indication, this slot may be additionally postponed due to another slot's offset indication, as illustrated in FIG. 5. Further, if the number of repetitions is K, the time domain resource allocation in the RAR uplink grant may be associated with the initial repetition slot (i.e., slot 1 in the example of FIG. 5), thus only K−1 slot offset indication information is needed. In some cases, to provide a unified RAR uplink grant payload size across different repetition factors, the slot offset information indication may be based on a maximum value of repetition factor, where the non-used elements may be reserved. An indication of slot offsets that is provided by the base station provides benefits of reduced UE processing required to determine if a certain slot is appropriate for the determined SSB. In other examples, such as illustrated in FIG. 6, the UE may determine slot offsets based on the RO-to-SSB mapping and slots that correspond to particular ROs.

Figure 6:
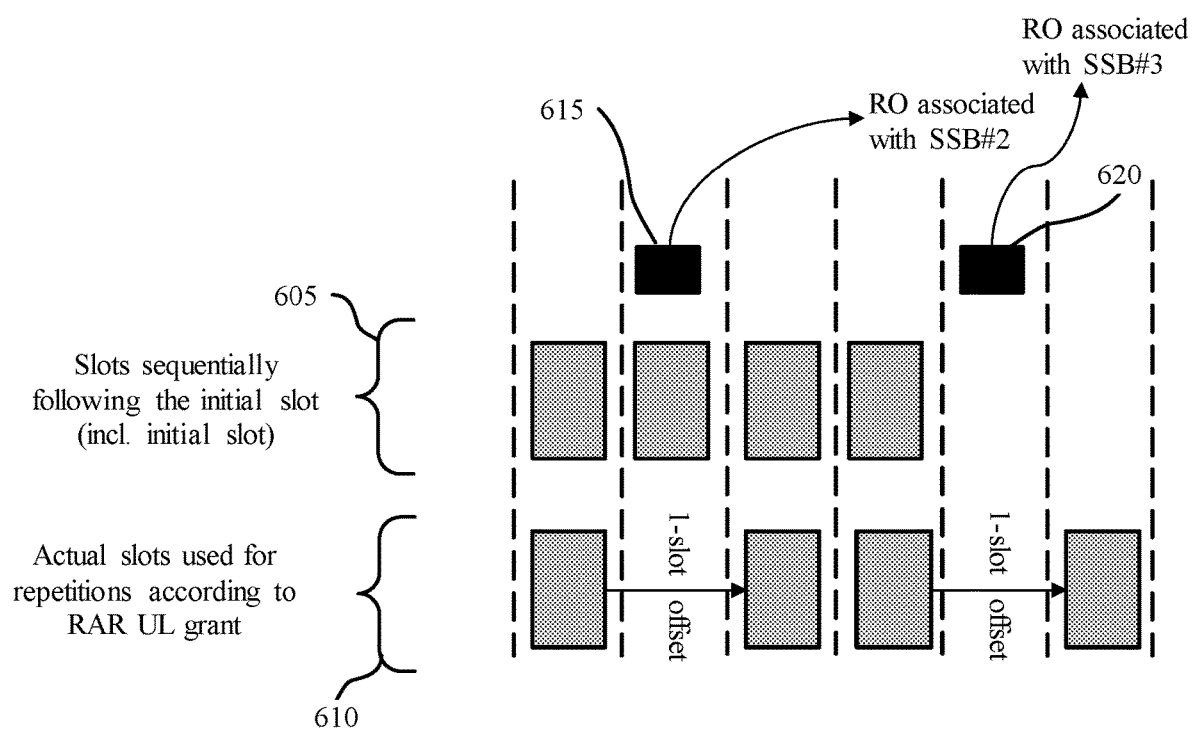
FIG. 6 illustrates an example of a UE determined slot offset that supports random access message repetition techniques in beamformed communications in accordance with aspects of the present disclosure.

FIG. 6 illustrates an example of a UE determined slot offset 600 that supports random access message repetition techniques in beamformed communications in accordance with aspects of the present disclosure. In some examples, UE determined slot offset 600 may implement aspects of wireless communications system 100 or 200. In this example, a UE (e.g., a UE 115 of FIG. 1 or 2) may determine slot offset information based on a mapping between ROs and SSBs, and which ROs correspond to a particular slot. In this example, a number of slots 605 sequentially following the initial slot (e.g., determined based on a predetermined number of slots after a random access response) may be identified as repetition slots. If one of the repetition slots scheduled for a repetition of the random access shared channel message transmission comprises a RO associated with other SSB(s) that are different from the SSB determined by the UE for transmitting a random access request, while the RO associated with the SSB determined by the UE is not associated with this slot, it may be determined to modify the repetition transmission (e.g., by postponing the transmission, dropping the transmission, or increasing a transmission power). In some cases, such a determination may be based on a random access configurations provided by the base station (e.g., in RMSI).

In this example, a RO 615 in a second slot may be associated with a different SSB than identified by the UE, and no other ROs associated with the second slot are associated with the SSB for transmitting the random access request. Thus, the UE may postpone this repetition slot and the repetition slots following this slot, with one or more slots, until a subsequent slot that is not associated with a RO associated with another SSB, which in this example is a third slot but in other cases if a subsequent slot is already postponed due to a previous slot's offset indication, this slot may be additionally postponed due to the other slot's offset indication. In this example, a fifth slot may be associated with a RO 620 that is associated with a different SSB, resulting in another repetition slot offset. Thus, in this example, the repetitions of the random access shared channel message are transmitted in slots 610, corresponding to the first, third, fourth, and sixth slots as illustrated in FIG. 6. Such UE determination of slot offsets provides no change or increase in payload size of RAR uplink grant, but may add processing complexity at the UE. In other cases, as described with reference to FIG. 7, a RAR uplink grant may provide an indication of one or more groups of slots that may have offsets, and the UE may determine offsets only for the indicated one or more groups.

Figure 7:
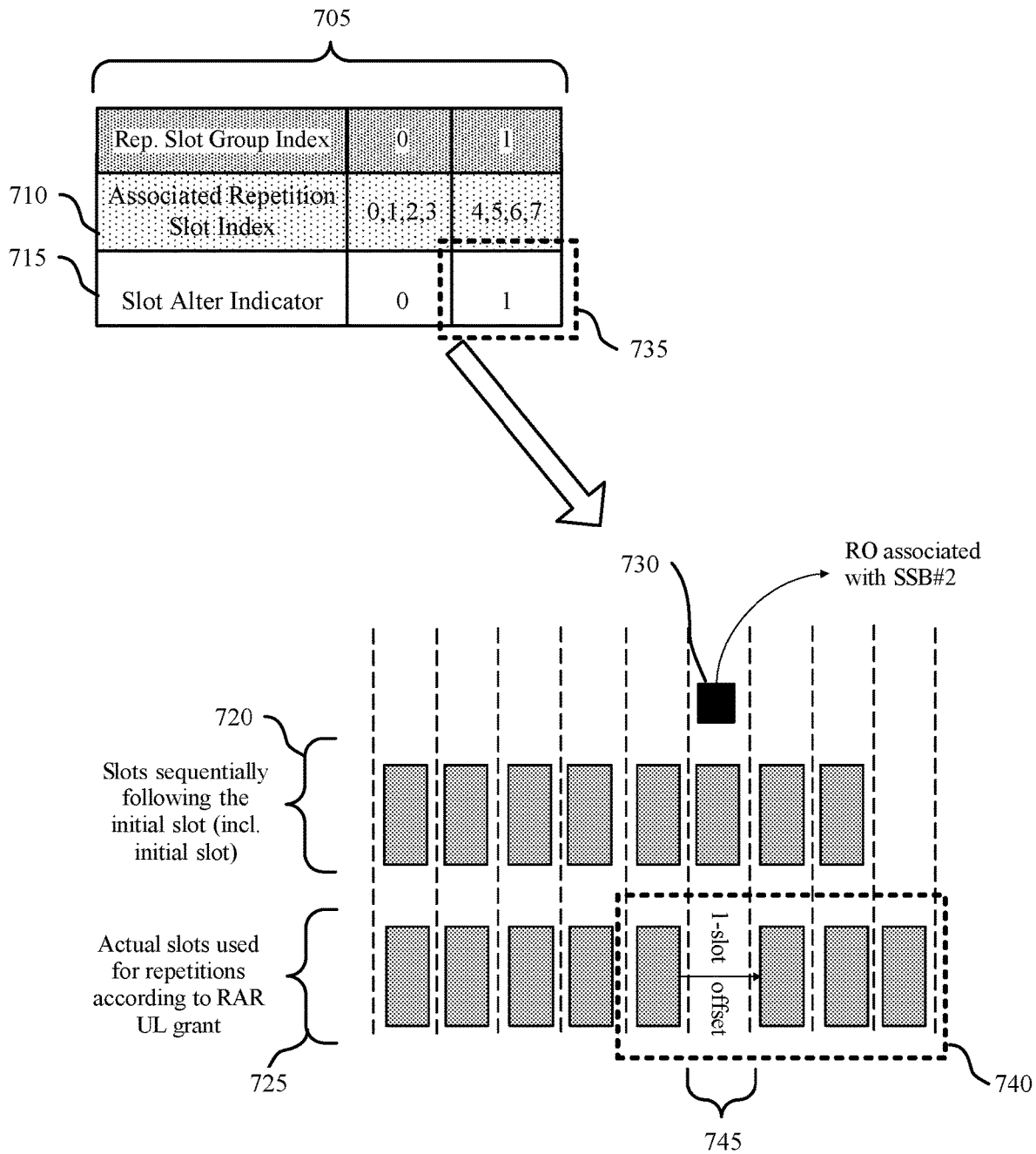
FIG. 7 illustrates an example of a group-based slot offset determination that supports random access message repetition techniques in beamformed communications in accordance with aspects of the present disclosure.

FIG. 7 illustrates an example of a group-based slot offset determination 700 that supports random access message repetition techniques in beamformed communications in accordance with aspects of the present disclosure. In some examples, group-based slot offset determination 700 may implement aspects of wireless communications system 100 or 200. In this example, slot offset information 705 may include a single bit in a slot alter indicator field 715 associated with a group of slots. In some cases, an associated repetition slot index 710 may be configured (e.g., in RMSI) that assigns repetition slots to different groups of slots. In this example, a value of zero in the slot alter indicator field 715 may indicate that none of the slots in that group have a repetition transmission offset, and a value of one in the field may indicate that one or more slots in the associated group may have a slot offset, which can be determined in a manner similarly as described with respect to FIG. 6. Such a joint use of a base station indication and UE determination may allow for smaller payload sizes in the RAR and also provide reduced UE complexity.

In the example of FIG. 7, a second group of slots 740 may be mapped to a second bit 735 in the slot alter indicator field 715. Based on the indication that this second group of slots 740 may be altered (while none of the other slots may have slot offsets), the UE or base station may identify that an identified slot 745 is associated with an RO 730 that is associated with a different SSB than identified for random access messages by the UE, and the identified slot 745 may not be associated with any RO that corresponds to the SSB identified by the UE. Thus, for the second group of slots 740, the UE may determine to postpone the repetition in the identified slot 745, resulting in the actual slots 725 used for repetitions being different than sequential slots 720 that starting with the initial slot for the random access shared channel message.

Figure 8:
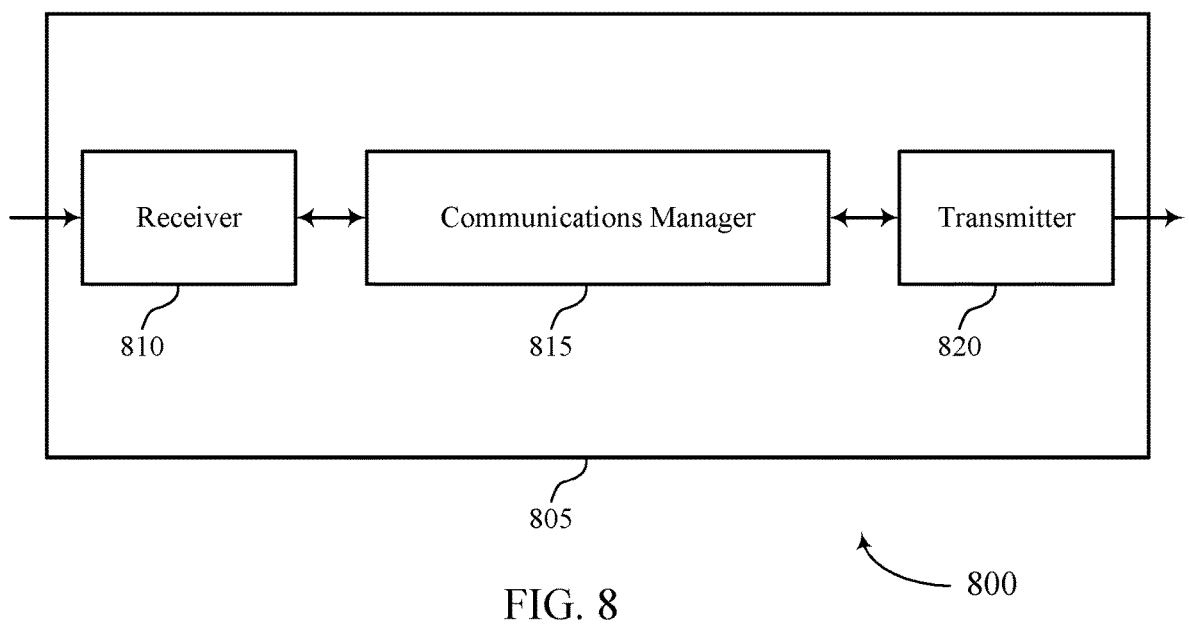
FIGS. 8 and 9 show block diagrams of devices that support random access message repetition techniques in beamformed communications in accordance with aspects of the present disclosure.

FIG. 8 shows a block diagram 800 of a device 805 that supports random access message repetition techniques in beamformed communications in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to random access message repetition techniques in beamformed communications). Information may be passed on to other components of the device 805. The receiver 810 may be an example of aspects of the transceiver 1120 described with reference to FIG. 11. The receiver 810 may utilize a single antenna or a set of antennas.

The communications manager 815 may identify a random access shared channel message that is to be transmitted to a base station, where the random access shared channel message is associated with a first synchronization signal block and a first random access occasion, and where two or more repetitions of the random access shared channel message are to be transmitted in two or more slots. Two or more repetitions of the random access shared channel message (e.g., RACH MSG3 transmissions) may include transmitting the random access shared channel message two or more times. For example, the communications manager 815 may transmit a RACH MSG3 two or more times. By way of example, the communications manager 815 may transmit a RACH MSG3 during a slot, and again transmit the RACH MSG3 during a subsequent slot. The communications manager 815 may transmit a first repetition of the random access shared channel message in a first slot that is associated with the first random access occasion, determine that a second slot available for transmission of a second repetition of the random access shared channel message is associated with one or more random access occasions that are each associated with one or more respective synchronization signal blocks that are different than the first synchronization signal block, and that the second slot is unassociated with the first random access occasion and the first synchronization signal block, and modify, based on the determining, the transmission of the second repetition of the random access shared channel message.

The communications manager 815 may also receive, responsive to a random access procedure initiated by the UE that is associated with a first random access occasion and a first synchronization signal block, a random access response message from a base station that includes a slot offset indication for a number of slots associated with a number of random access shared channel message repetitions scheduled by the random access response message, transmit, based on the random access response message, a first repetition of a random access shared channel message in a first slot that is associated with the first random access occasion, determine a slot offset for transmitting a second repetition of the random access shared channel message based on the slot offset indication, and transmit the second repetition of the random access shared channel message based on the determining. The communications manager 815 may be an example of aspects of the communications manager 1110 described herein. The communications manager 815 may as described herein be implemented to realize one or more potential advantages. One implementation may allow the device 805 to reliably transmit repetitions of a random access shared channel message to a base station, in order to enhance likelihood of successful receipt at the base station.

The communications manager 815, or its sub-components, may be implemented in hardware, software (e.g., executed by a processor), or any combination thereof. If implemented in code executed by a processor, the functions of the communications manager 815, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
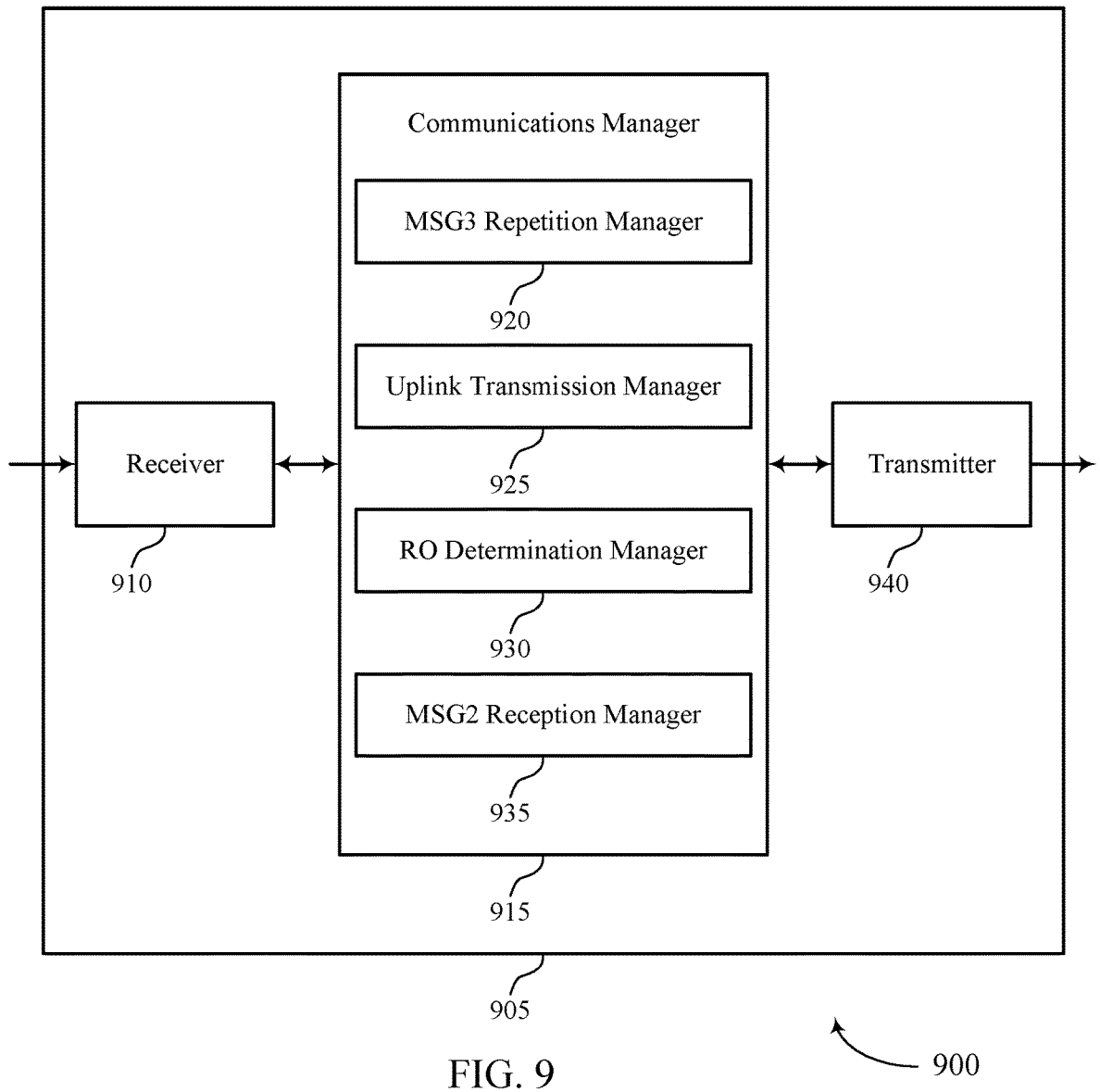

FIG. 9 shows a block diagram 900 of a device 905 that supports random access message repetition techniques in beamformed communications in accordance with aspects of the present disclosure. The device 905 may be an example of aspects of a device 805, or a UE 115 as described herein. The device 905 may include a receiver 910, a communications manager 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, and information related to random access message repetition techniques in beamformed communications). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a MSG3 repetition manager 920, an uplink transmission manager 925, a RO determination manager 930, and a MSG2 reception manager 935. The communications manager 915 may be an example of aspects of the communications manager 1110 described herein. In some cases, the MSG3 repetition manager 920 may identify a random access shared channel message that is to be transmitted to a base station, where the random access shared channel message is associated with a first synchronization signal block and a first random access occasion, and where two or more repetitions of the random access shared channel message are to be transmitted in two or more slots. The uplink transmission manager 925 may transmit a first repetition of the random access shared channel message in a first slot that is associated with the first random access occasion. The RO determination manager 930 may determine that a second slot available for transmission of a second repetition of the random access shared channel message is associated with one or more random access occasions that are each associated with one or more respective synchronization signal blocks that are different than the first synchronization signal block, and that the second slot is unassociated with the first random access occasion and the first synchronization signal block and modify, based on the determining, the transmission of the second repetition of the random access shared channel message.

In some cases, the MSG2 reception manager 935 may receive, responsive to a random access procedure initiated by the UE that is associated with a first random access occasion and a first synchronization signal block, a random access response message from a base station that includes a slot offset indication for a number of slots associated with a number of random access shared channel message repetitions scheduled by the random access response message. The MSG3 repetition manager 920 may transmit, based on the random access response message, a first repetition of a random access shared channel message in a first slot that is associated with the first random access occasion. The RO determination manager 930 may determine a slot offset for transmitting a second repetition of the random access shared channel message based on the slot offset indication and transmit the second repetition of the random access shared channel message based on the determining.

The transmitter 940 may transmit signals generated by other components of the device 905. In some examples, the transmitter 940 may be collocated with a receiver 910 in a transceiver module. For example, the transmitter 940 may be an example of aspects of the transceiver 1120 described with reference to FIG. 11. The transmitter 940 may utilize a single antenna or a set of antennas.

Figure 10:
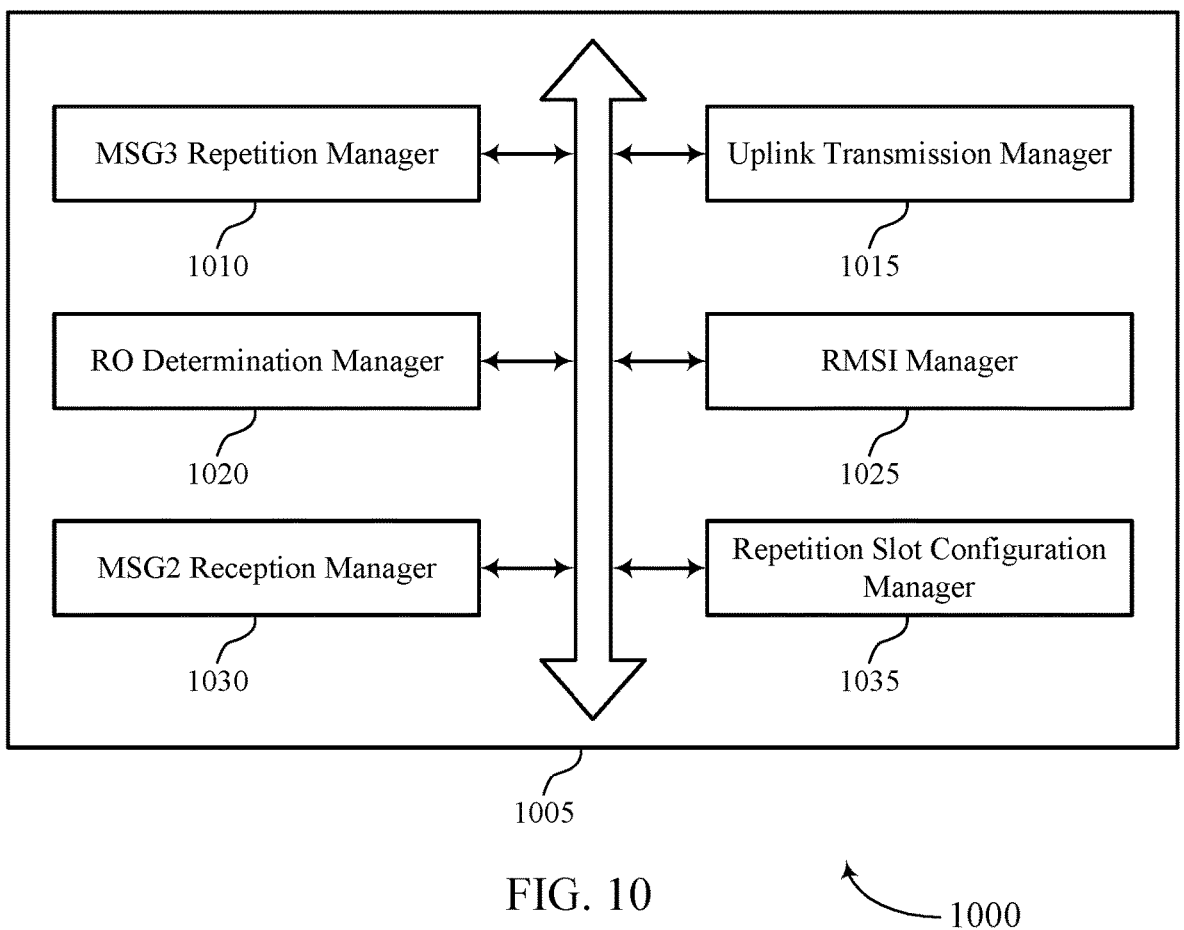
FIG. 10 shows a block diagram of a communications manager that supports random access message repetition techniques in beamformed communications in accordance with aspects of the present disclosure.

FIG. 10 shows a block diagram 1000 of a communications manager 1005 that supports random access message repetition techniques in beamformed communications in accordance with aspects of the present disclosure. The communications manager 1005 may be an example of aspects of a communications manager 815, a communications manager 915, or a communications manager 1110 described herein. The communications manager 1005 may include a MSG3 repetition manager 1010, an uplink transmission manager 1015, a RO determination manager 1020, a RMSI manager 1025, a MSG2 reception manager 1030, and a repetition slot configuration manager 1035. Each of these modules may communicate, directly or indirectly, with one another (e.g., via one or more buses).

The MSG3 repetition manager 1010 may identify a random access shared channel message that is to be transmitted to a base station, where the random access shared channel message is associated with a first synchronization signal block and a first random access occasion, and where two or more repetitions of the random access shared channel message are to be transmitted in two or more slots. In some examples, the MSG3 repetition manager 1010 may transmit, based on the random access response message, a first repetition of a random access shared channel message in a first slot that is associated with the first random access occasion. In some examples, the MSG3 repetition manager 1010 may drop the second repetition associated with the second slot. In some examples, the MSG3 repetition manager 1010 may determine a transmission power of one or more repetitions of the random access shared channel message, where the transmission power is increased relative to another transmission power in the first slot. In some cases, the first slot is determined based on a prior slot that includes a random access response message from the base station that schedules the random access shared channel message, and where the first slot is a predetermined number of slots following the prior slot that includes a random access response message.

The uplink transmission manager 1015 may transmit a first repetition of the random access shared channel message in a first slot that is associated with the first random access occasion. The RO determination manager 1020 may determine that a second slot available for transmission of a second repetition of the random access shared channel message is associated with one or more random access occasions that are each associated with one or more respective synchronization signal blocks that are different than the first synchronization signal block, and that the second slot is unassociated with the first random access occasion and the first synchronization signal block. In some examples, the RO determination manager 1020 may modify, based on the determining, the transmission of the second repetition of the random access shared channel message. In some examples, the RO determination manager 1020 may determine a slot offset for transmitting a second repetition of the random access shared channel message based on the slot offset indication. In some examples, the RO determination manager 1020 may transmit the second repetition of the random access shared channel message based on the determining. In some examples, the RO determination manager 1020 may postpone the transmission of the second repetition of the random access shared channel message in the second slot.

In some examples, the RO determination manager 1020 may identify a third slot subsequent to the second slot, where the third slot is a closest available slot that is associated with a random access occasion that is associated with the first synchronization signal block. In some examples, the RO determination manager 1020 may transmit the second repetition of the random access shared channel message in the third slot. In some examples, the RO determination manager 1020 may postpone, based on the postponing of the second repetition of the random access shared channel message, a transmission of a third repetition of the random access shared channel message until a fourth slot subsequent to the third slot, where the fourth slot is a closest available slot that is associated with a random access occasion that is associated with the first synchronization signal block.

In some examples, the RO determination manager 1020 may determine that a fourth slot available for transmission of a third repetition of the random access shared channel message is associated with one or more random access occasions that are each associated with one or more respective synchronization signal blocks that are different than the first synchronization signal block, and that the fourth slot is unassociated with the first random access occasion and the first synchronization signal block. In some examples, the RO determination manager 1020 may postpone, based on the determining, the transmission of the third repetition of the random access shared channel message until a fifth slot subsequent to the fourth slot, where the fifth slot is a closest available slot that is associated with a random access occasion that is associated with the first synchronization signal block.

The MSG2 reception manager 1030 may receive, responsive to a random access procedure initiated by the UE that is associated with a first random access occasion and a first synchronization signal block, a random access response message from a base station that includes a slot offset indication for a number of slots associated with a number of random access shared channel message repetitions scheduled by the random access response message. In some cases, the slot offset indication is included in a prespecified number of bits in the random access response message. The RMSI manager 1025 may receive, from the base station, system information that indicates a mapping between possible slot offset values and a number of offset slots. In some cases, the determining is based on one or more synchronization signal block to random access occasion preamble associations provided in a remaining minimum system information communication of the base station.

The repetition slot configuration manager 1035 may determine a random access configuration. In some examples, slot offsets for transmitting repetitions of the random access shared channel message are partitioned into two or more bits associated with respective two or more groups of random access shared channel message slots, and where a value of each of the two or more bits are determined based on whether any slot in the associated group of slots is associated with one or more random access occasions that are associated with one or more respective synchronization signal blocks that are different than the first synchronization signal block and not associated with the first random access occasion or the first synchronization signal block.

The repetition slot configuration manager 1035 may postpone the transmission of the second repetition of the random access shared channel message in a second slot of the first group based on the second slot of the first group being associated with one or more random access occasions that are each associated with one or more respective synchronization signal blocks that are different than the first synchronization signal block, and the second slot being unassociated with the first random access occasion and the first synchronization signal block. In some examples, slot offsets for transmitting repetitions of the random access shared channel message are partitioned into two or more bits associated with respective two or more groups of random access shared channel message slots, and where a value of each of the two or more bits are determined based on whether any slot in the associated group of slots is associated with one or more random access occasions that are associated with one or more respective synchronization signal blocks that are different than the first synchronization signal block and not associated with the first random access occasion or the first synchronization signal block.

In some cases, the first slot is determined from a first group of the two or more groups of random access shared channel message slots based on a prior slot that includes a random access response message from the base station that schedules the random access shared channel message, and where the first slot is a predetermined number of slots following the prior slot that includes a random access response message. In some cases, the slot offset indication provides a slot offset value from zero to a positive integer, for each random access shared channel message repetition of the random access shared channel message repetitions subsequent to the first random access shared channel message. In some cases, the first slot is determined from a first group of the two or more groups of random access shared channel message slots based on a prior slot that includes a random access response message from the base station that schedules the random access shared channel message, and where the first slot is a predetermined number of slots following the prior slot that includes a random access response message.

Figure 11:
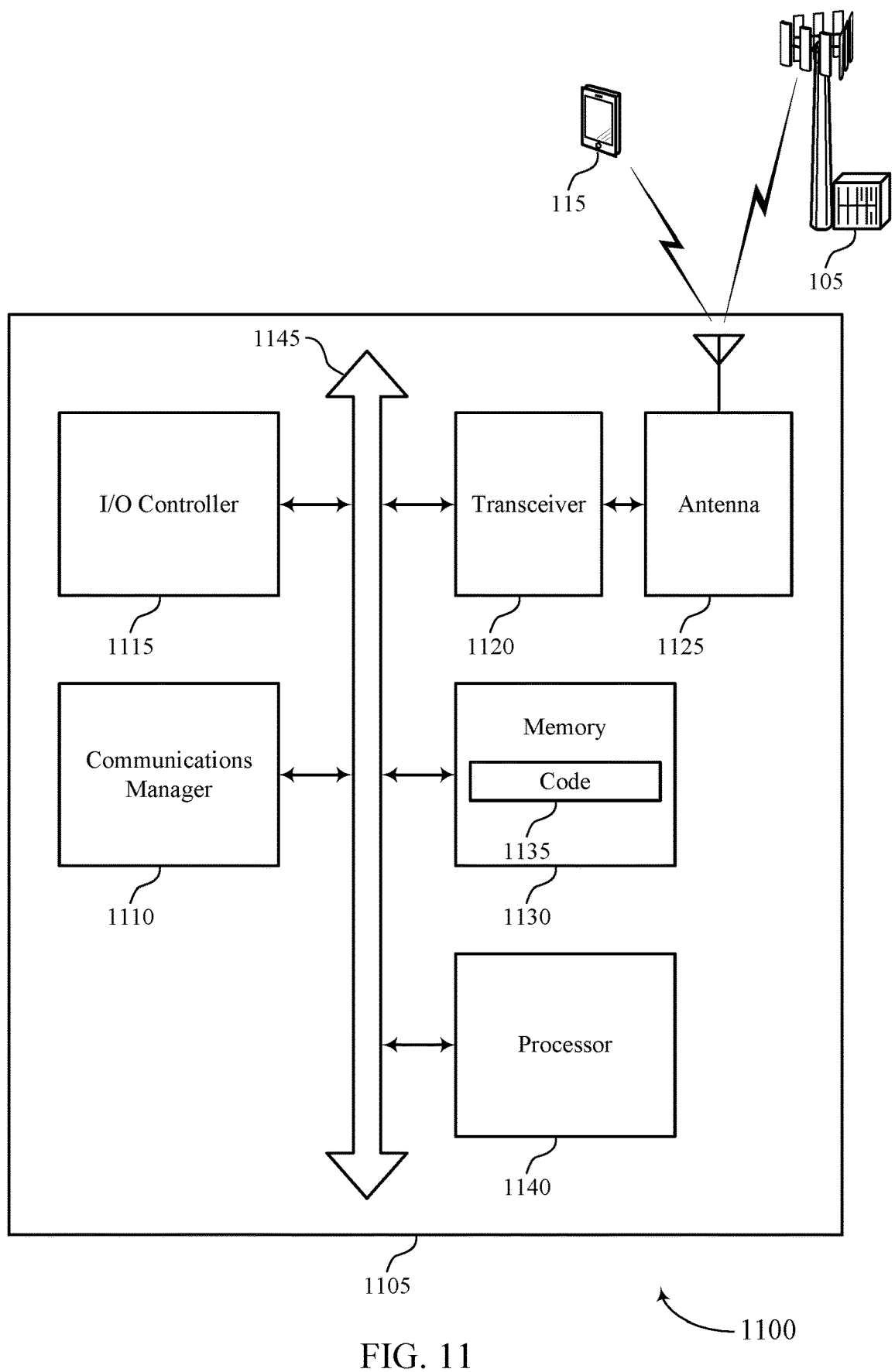
FIG. 11 shows a diagram of a system including a device that supports random access message repetition techniques in beamformed communications in accordance with aspects of the present disclosure.

FIG. 11 shows a diagram of a system 1100 including a device 1105 that supports random access message repetition techniques in beamformed communications in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may identify a random access shared channel message that is to be transmitted to a base station, where the random access shared channel message is associated with a first synchronization signal block and a first random access occasion, and where two or more repetitions of the random access shared channel message are to be transmitted in two or more slots, transmit a first repetition of the random access shared channel message in a first slot that is associated with the first random access occasion, determine that a second slot available for transmission of a second repetition of the random access shared channel message is associated with one or more random access occasions that are each associated with one or more respective synchronization signal blocks that are different than the first synchronization signal block, and that the second slot is unassociated with the first random access occasion and the first synchronization signal block, and modify, based on the determining, the transmission of the second repetition of the random access shared channel message.

The communications manager 1110 may also receive, responsive to a random access procedure initiated by the UE that is associated with a first random access occasion and a first synchronization signal block, a random access response message from a base station that includes a slot offset indication for a number of slots associated with a number of random access shared channel message repetitions scheduled by the random access response message, transmit, based on the random access response message, a first repetition of a random access shared channel message in a first slot that is associated with the first random access occasion, determine a slot offset for transmitting a second repetition of the random access shared channel message based on the slot offset indication, and transmit the second repetition of the random access shared channel message based on the determining. The communications manager 1110 may as described herein be implemented to realize one or more potential advantages. One implementation may allow the device 1105 to reliably transmit repetitions of a random access shared channel message to a base station, in order to enhance likelihood of successful receipt at the base station.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as WISED, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas. In some cases, the device 1105 may include a single antenna 1125. However, in some cases, the device 1105 may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a basic input-output system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting random access message repetition techniques in beamformed communications).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
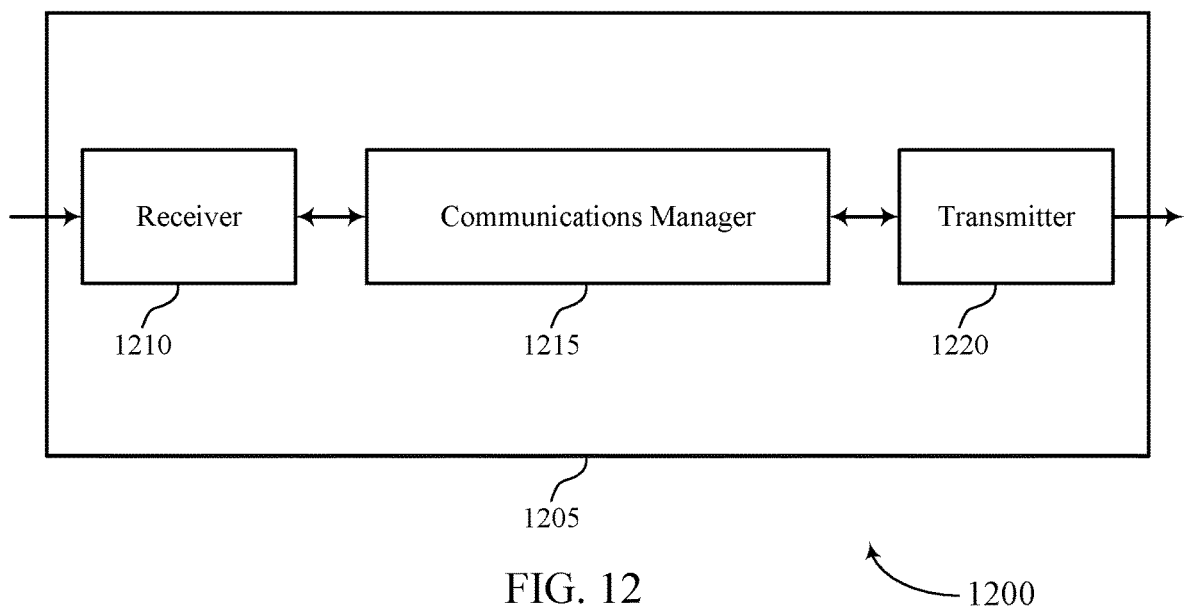
FIGS. 12 and 13 show block diagrams of devices that support random access message repetition techniques in beamformed communications in accordance with aspects of the present disclosure.

FIG. 12 shows a block diagram 1200 of a device 1205 that supports random access message repetition techniques in beamformed communications in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to random access message repetition techniques in beamformed communications). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may initiate a random access procedure with a UE, where the random access procedure includes a random access shared channel message that is to be transmitted by the UE, where the random access shared channel message is associated with a first synchronization signal block and a first random access occasion, and where two or more repetitions of the random access shared channel message are to be transmitted in two or more slots, receive, from the UE, a first repetition of the random access shared channel message in a first slot that is associated with the first random access occasion, determine that a second slot available for transmission of a second repetition of the random access shared channel message is associated with one or more random access occasions that are each associated with one or more respective synchronization signal blocks that are different than the first synchronization signal block, and that the second slot is unassociated with the first random access occasion and the first synchronization signal block, and monitor, based on the determining, for the second repetition of the random access shared channel message in a subsequent random access occasion after the second slot.

The communications manager 1215 may also transmit, responsive to a random access procedure initiated by a UE that is associated with a first random access occasion and a first synchronization signal block, a random access response message to the UE that includes a slot offset indication for a number of slots associated with a number of random access shared channel message repetitions scheduled by the random access response message, determine a slot offset for receiving a second repetition of the random access shared channel message based on the slot offset indication, receive, based on the random access response message, a first repetition of a random access shared channel message in a first slot that is associated with the first random access occasion, and receive the second repetition of the random access shared channel message based on the determining. The communications manager 1215 may be an example of aspects of the communications manager 1510 described herein.

The communications manager 1215, or its sub-components, may be implemented in hardware, software (e.g., executed by a processor), or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
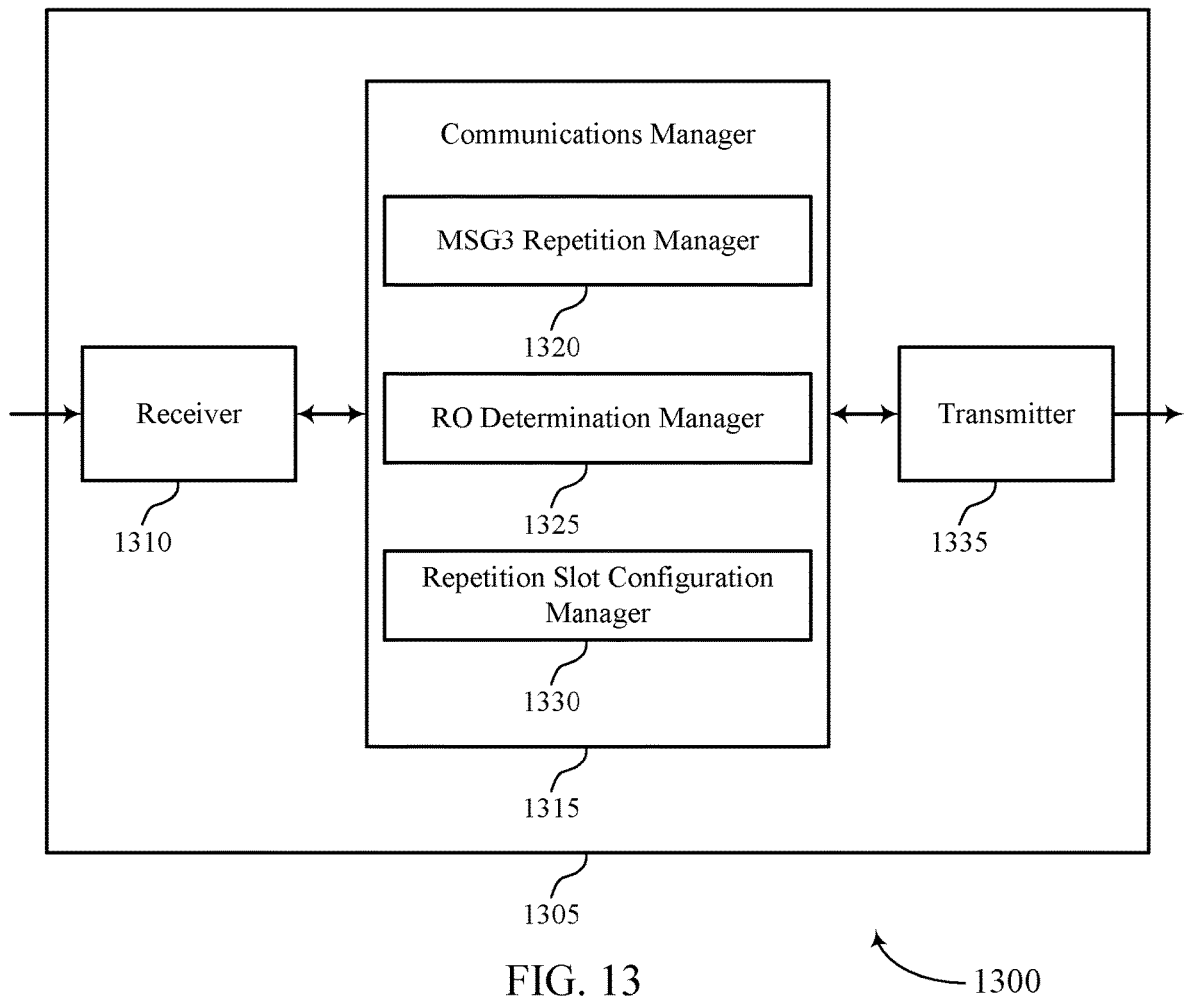

FIG. 13 shows a block diagram 1300 of a device 1305 that supports random access message repetition techniques in beamformed communications in accordance with aspects of the present disclosure. The device 1305 may be an example of aspects of a device 1205, or a base station 105 as described herein. The device 1305 may include a receiver 1310, a communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to random access message repetition techniques in beamformed communications). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a MSG3 repetition manager 1320, a RO determination manager 1325, and a repetition slot configuration manager 1330. The communications manager 1315 may be an example of aspects of the communications manager 1510 described herein.

The MSG3 repetition manager 1320 may initiate a random access procedure with a UE, where the random access procedure includes a random access shared channel message that is to be transmitted by the UE, where the random access shared channel message is associated with a first synchronization signal block and a first random access occasion, and where two or more repetitions of the random access shared channel message are to be transmitted in two or more slots and receive, from the UE, a first repetition of the random access shared channel message in a first slot that is associated with the first random access occasion. In some cases, the MSG3 repetition manager 1320 may receive, based on the random access response message, a first repetition of a random access shared channel message in a first slot that is associated with the first random access occasion and receive the second repetition of the random access shared channel message based on the determining.

The RO determination manager 1325 may determine that a second slot available for transmission of a second repetition of the random access shared channel message is associated with one or more random access occasions that are each associated with one or more respective synchronization signal blocks that are different than the first synchronization signal block, and that the second slot is unassociated with the first random access occasion and the first synchronization signal block and monitor, based on the determining, for the second repetition of the random access shared channel message in a subsequent random access occasion after the second slot.

The repetition slot configuration manager 1330 may transmit, responsive to a random access procedure initiated by a UE that is associated with a first random access occasion and a first synchronization signal block, a random access response message to the UE that includes a slot offset indication for a number of slots associated with a number of random access shared channel message repetitions scheduled by the random access response message. In some cases, the repetition slot configuration manager 1330 may determine a slot offset for receiving a second repetition of the random access shared channel message based on the slot offset indication.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
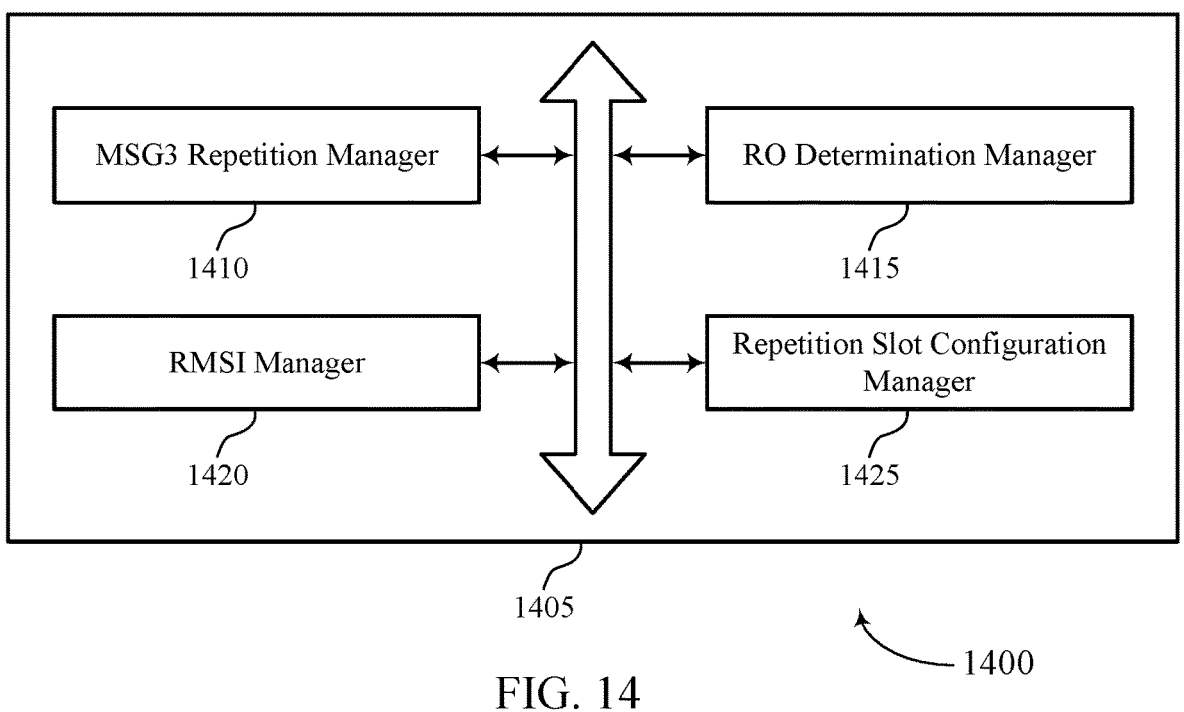
FIG. 14 shows a block diagram of a communications manager that supports random access message repetition techniques in beamformed communications in accordance with aspects of the present disclosure.

FIG. 14 shows a block diagram 1400 of a communications manager 1405 that supports random access message repetition techniques in beamformed communications in accordance with aspects of the present disclosure. The communications manager 1405 may be an example of aspects of a communications manager 1215, a communications manager 1315, or a communications manager 1510 described herein. The communications manager 1405 may include a MSG3 repetition manager 1410, a RO determination manager 1415, a RMSI manager 1420, and a repetition slot configuration manager 1425. Each of these modules may communicate, directly or indirectly, with one another (e.g., via one or more buses).

The MSG3 repetition manager 1410 may initiate a random access procedure with a UE, where the random access procedure includes a random access shared channel message that is to be transmitted by the UE, where the random access shared channel message is associated with a first synchronization signal block and a first random access occasion, and where two or more repetitions of the random access shared channel message are to be transmitted in two or more slots. In some examples, the MSG3 repetition manager 1410 may receive, from the UE, a first repetition of the random access shared channel message in a first slot that is associated with the first random access occasion. In some cases, the first slot is determined based on a prior slot that includes a random access response message from the base station that schedules the random access shared channel message, and where the first slot is a predetermined number of slots following the prior slot that includes a random access response message. In some examples, the MSG3 repetition manager 1410 may receive the second repetition of the random access shared channel message based on the determining. In some cases, the second repetition associated with the second slot is dropped. In some cases, a transmission power of one or more repetitions of the random access shared channel message is increased relative to another transmission power in the first slot.

The RO determination manager 1415 may determine that a second slot available for transmission of a second repetition of the random access shared channel message is associated with one or more random access occasions that are each associated with one or more respective synchronization signal blocks that are different than the first synchronization signal block, and that the second slot is unassociated with the first random access occasion and the first synchronization signal block. In some examples, the RO determination manager 1415 may monitor, based on the determining, for the second repetition of the random access shared channel message in a subsequent random access occasion after the second slot. In some examples, the RO determination manager 1415 may postpone the monitoring for the second repetition of the random access shared channel message in the second slot.

In some examples, the RO determination manager 1415 may identify a third slot subsequent to the second slot, where the third slot is a closest available slot that is associated with a random access occasion that is associated with the first synchronization signal block. In some examples, the RO determination manager 1415 may monitor for the second repetition of the random access shared channel message in the third slot. In some examples, the RO determination manager 1415 may postpone, based on the postponing of monitoring for the second repetition of the random access shared channel message, monitoring for a third repetition of the random access shared channel message until a fourth slot subsequent to the third slot, where the fourth slot is a closest available slot that is associated with a random access occasion that is associated with the first synchronization signal block.

In some examples, the RO determination manager 1415 may determine that a fourth slot available for transmission of a third repetition of the random access shared channel message is associated with one or more random access occasions that are each associated with one or more respective synchronization signal blocks that are different than the first synchronization signal block, and that the fourth slot is unassociated with the first random access occasion and the first synchronization signal block. In some examples, the RO determination manager 1415 may postpone, based on the determining, monitoring for the third repetition of the random access shared channel message until a fifth slot subsequent to the fourth slot, where the fifth slot is a closest available slot that is associated with a random access occasion that is associated with the first synchronization signal block.

The repetition slot configuration manager 1425 may transmit, responsive to a random access procedure initiated by a UE that is associated with a first random access occasion and a first synchronization signal block, a random access response message to the UE that includes a slot offset indication for a number of slots associated with a number of random access shared channel message repetitions scheduled by the random access response message. In some examples, the repetition slot configuration manager 1425 may determine a slot offset for receiving a second repetition of the random access shared channel message based on the slot offset indication. In some examples, the repetition slot configuration manager 1425 may transmit, to the UE, a slot offset indication in a random access response message, and where the determining is based on the slot offset indication. In some examples, slot offsets for transmitting repetitions of the random access shared channel message are partitioned into two or more bits associated with respective two or more groups of random access shared channel message slots, and where a value of each of the two or more bits are determined based on whether any slot in the associated group of slots is associated with one or more random access occasions that are associated with one or more respective synchronization signal blocks that are different than the first synchronization signal block and not associated with the first random access occasion or the first synchronization signal block.

In some cases, the first slot is determined from a first group of the two or more groups of random access shared channel message slots based on a prior slot that includes a random access response message from the base station that schedules the random access shared channel message, and where the first slot is a predetermined number of slots following the prior slot that includes a random access response message. In some cases, the slot offset indication provides a slot offset value from zero to a positive integer, for each random access shared channel message repetition of the random access shared channel message repetitions subsequent to the first random access shared channel message. In some cases, the slot offset indication is included in a prespecified number of bits in the random access response message. The RMSI manager 1420 may transmit, to the UE, system information that indicates a mapping between possible slot offset values and a number of offset slots. In some cases, the determining is based on one or more synchronization signal block-to-random access occasion preamble associations provided in a remaining minimum system information communication of the base station.

Figure 15:
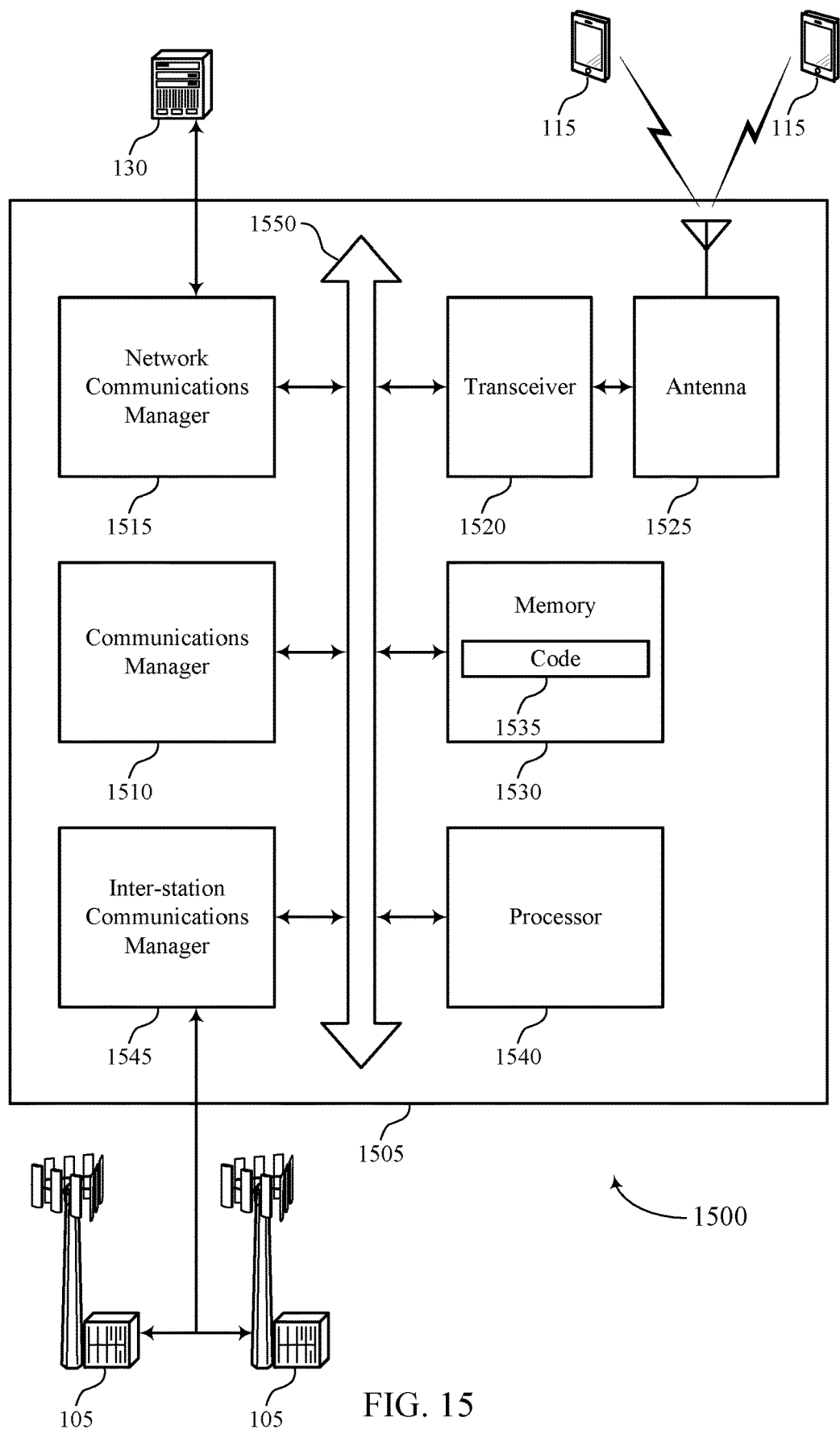
FIG. 15 shows a diagram of a system including a device that supports random access message repetition techniques in beamformed communications in accordance with aspects of the present disclosure.

FIG. 15 shows a diagram of a system 1500 including a device 1505 that supports random access message repetition techniques in beamformed communications in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may initiate a random access procedure with a UE, where the random access procedure includes a random access shared channel message that is to be transmitted by the UE, where the random access shared channel message is associated with a first synchronization signal block and a first random access occasion, and where two or more repetitions of the random access shared channel message are to be transmitted in two or more slots, receive, from the UE, a first repetition of the random access shared channel message in a first slot that is associated with the first random access occasion, determine that a second slot available for transmission of a second repetition of the random access shared channel message is associated with one or more random access occasions that are each associated with one or more respective synchronization signal blocks that are different than the first synchronization signal block, and that the second slot is unassociated with the first random access occasion and the first synchronization signal block, and monitor, based on the determining, for the second repetition of the random access shared channel message in a subsequent random access occasion after the second slot.

The communications manager 1510 may also transmit, responsive to a random access procedure initiated by a UE that is associated with a first random access occasion and a first synchronization signal block, a random access response message to the UE that includes a slot offset indication for a number of slots associated with a number of random access shared channel message repetitions scheduled by the random access response message, determine a slot offset for receiving a second repetition of the random access shared channel message based on the slot offset indication, receive, based on the random access response message, a first repetition of a random access shared channel message in a first slot that is associated with the first random access occasion, and receive the second repetition of the random access shared channel message based on the determining.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas. In some cases, the device 1505 may include a single antenna 1525. However, in some cases, the device 1505 may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting random access message repetition techniques in beamformed communications).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
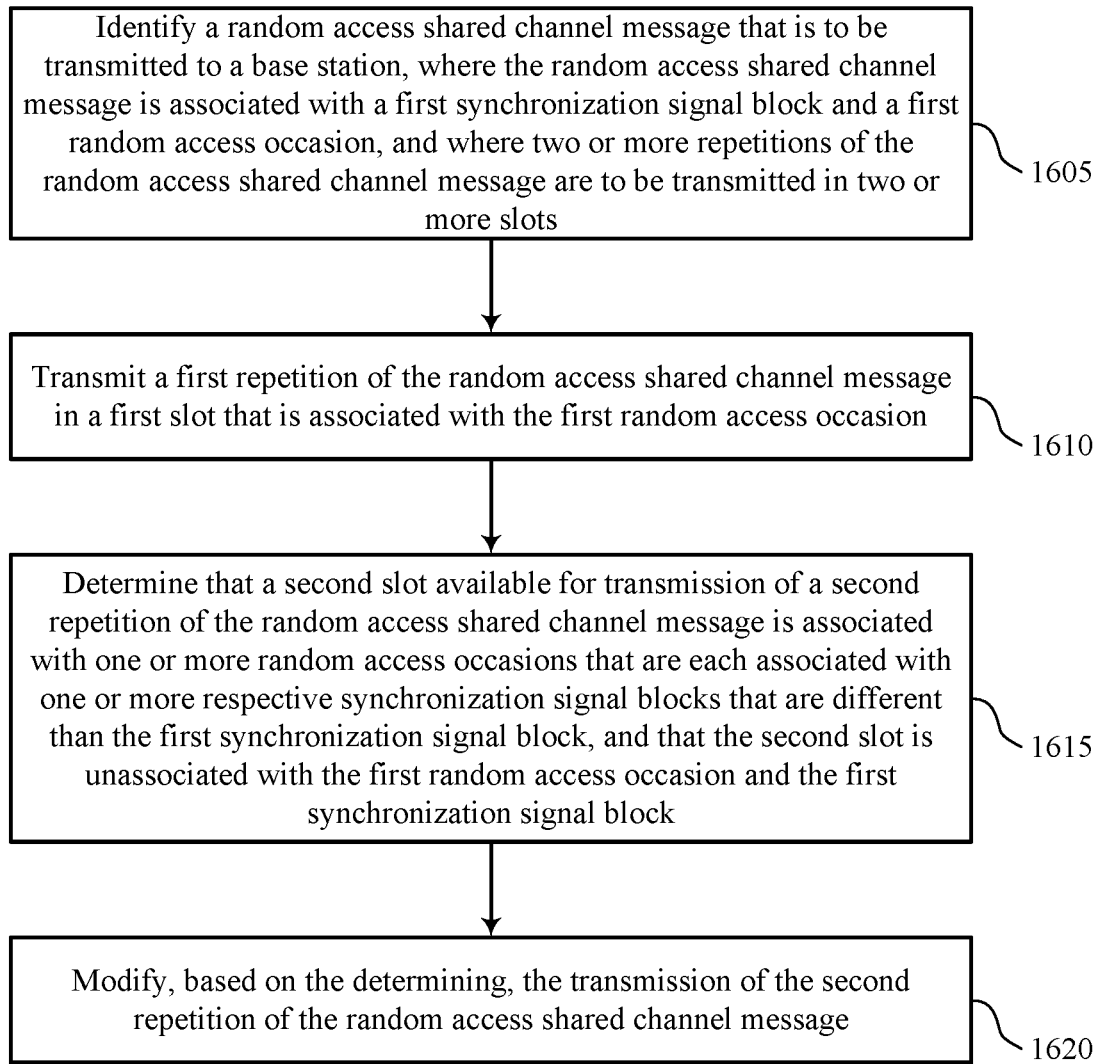
FIGS. 16 through 24 show flowcharts illustrating methods that support random access message repetition techniques in beamformed communications in accordance with aspects of the present disclosure.

FIG. 16 shows a flowchart illustrating a method 1600 that supports random access message repetition techniques in beamformed communications in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may identify a random access shared channel message that is to be transmitted to a base station, where the random access shared channel message is associated with a first synchronization signal block and a first random access occasion, and where two or more repetitions of the random access shared channel message are to be transmitted in two or more slots. The operations of 1605 may be performed according to the methods described herein. In some examples, aspects of the operations of 1605 may be performed by a MSG3 repetition manager as described with reference to FIGS. 8 through 11.

At 1610, the UE may transmit a first repetition of the random access shared channel message in a first slot that is associated with the first random access occasion. The operations of 1610 may be performed according to the methods described herein. In some examples, aspects of the operations of 1610 may be performed by an uplink transmission manager as described with reference to FIGS. 8 through 11.

At 1615, the UE may determine that a second slot available for transmission of a second repetition of the random access shared channel message is associated with one or more random access occasions that are each associated with one or more respective synchronization signal blocks that are different than the first synchronization signal block, and that the second slot is unassociated with the first random access occasion and the first synchronization signal block. The operations of 1615 may be performed according to the methods described herein. In some examples, aspects of the operations of 1615 may be performed by a RO determination manager as described with reference to FIGS. 8 through 11.

At 1620, the UE may modify, based on the determining, the transmission of the second repetition of the random access shared channel message. The operations of 1620 may be performed according to the methods described herein. In some examples, aspects of the operations of 1620 may be performed by a RO determination manager as described with reference to FIGS. 8 through 11.

Figure 17:
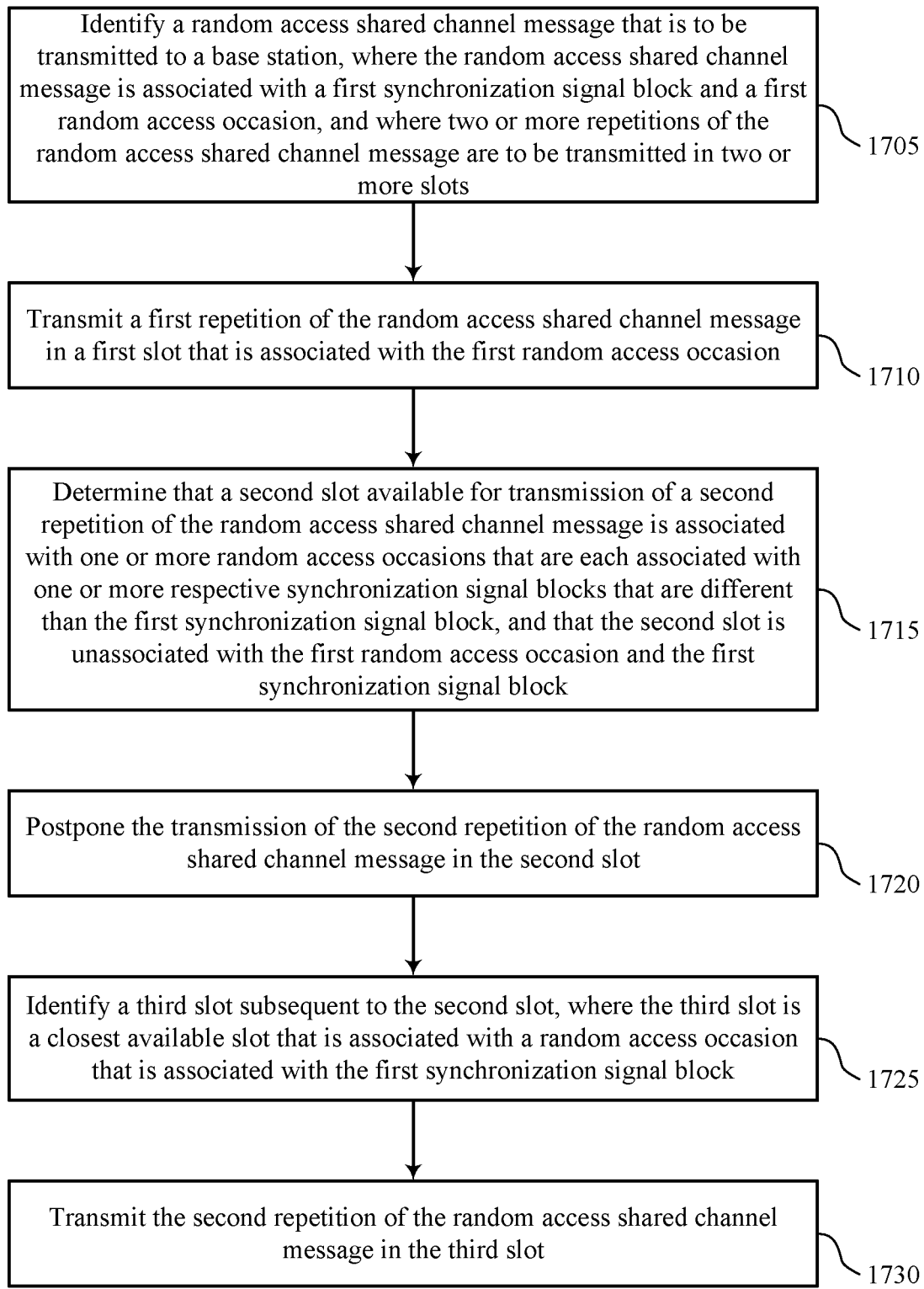

FIG. 17 shows a flowchart illustrating a method 1700 that supports random access message repetition techniques in beamformed communications in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may identify a random access shared channel message that is to be transmitted to a base station, where the random access shared channel message is associated with a first synchronization signal block and a first random access occasion, and where two or more repetitions of the random access shared channel message are to be transmitted in two or more slots. The operations of 1705 may be performed according to the methods described herein. In some examples, aspects of the operations of 1705 may be performed by a MSG3 repetition manager as described with reference to FIGS. 8 through 11.

At 1710, the UE may transmit a first repetition of the random access shared channel message in a first slot that is associated with the first random access occasion. The operations of 1710 may be performed according to the methods described herein. In some examples, aspects of the operations of 1710 may be performed by an uplink transmission manager as described with reference to FIGS. 8 through 11.

At 1715, the UE may determine that a second slot available for transmission of a second repetition of the random access shared channel message is associated with one or more random access occasions that are each associated with one or more respective synchronization signal blocks that are different than the first synchronization signal block, and that the second slot is unassociated with the first random access occasion and the first synchronization signal block. The operations of 1715 may be performed according to the methods described herein. In some examples, aspects of the operations of 1715 may be performed by a RO determination manager as described with reference to FIGS. 8 through 11.

At 1720, the UE may postpone the transmission of the second repetition of the random access shared channel message in the second slot. The operations of 1720 may be performed according to the methods described herein. In some examples, aspects of the operations of 1720 may be performed by a RO determination manager as described with reference to FIGS. 8 through 11.

At 1725, the UE may identify a third slot subsequent to the second slot, where the third slot is a closest available slot that is associated with a random access occasion that is associated with the first synchronization signal block. The operations of 1725 may be performed according to the methods described herein. In some examples, aspects of the operations of 1725 may be performed by a RO determination manager as described with reference to FIGS. 8 through 11.

At 1730, the UE may transmit the second repetition of the random access shared channel message in the third slot. The operations of 1730 may be performed according to the methods described herein. In some examples, aspects of the operations of 1730 may be performed by a RO determination manager as described with reference to FIGS. 8 through 11.

Figure 18:
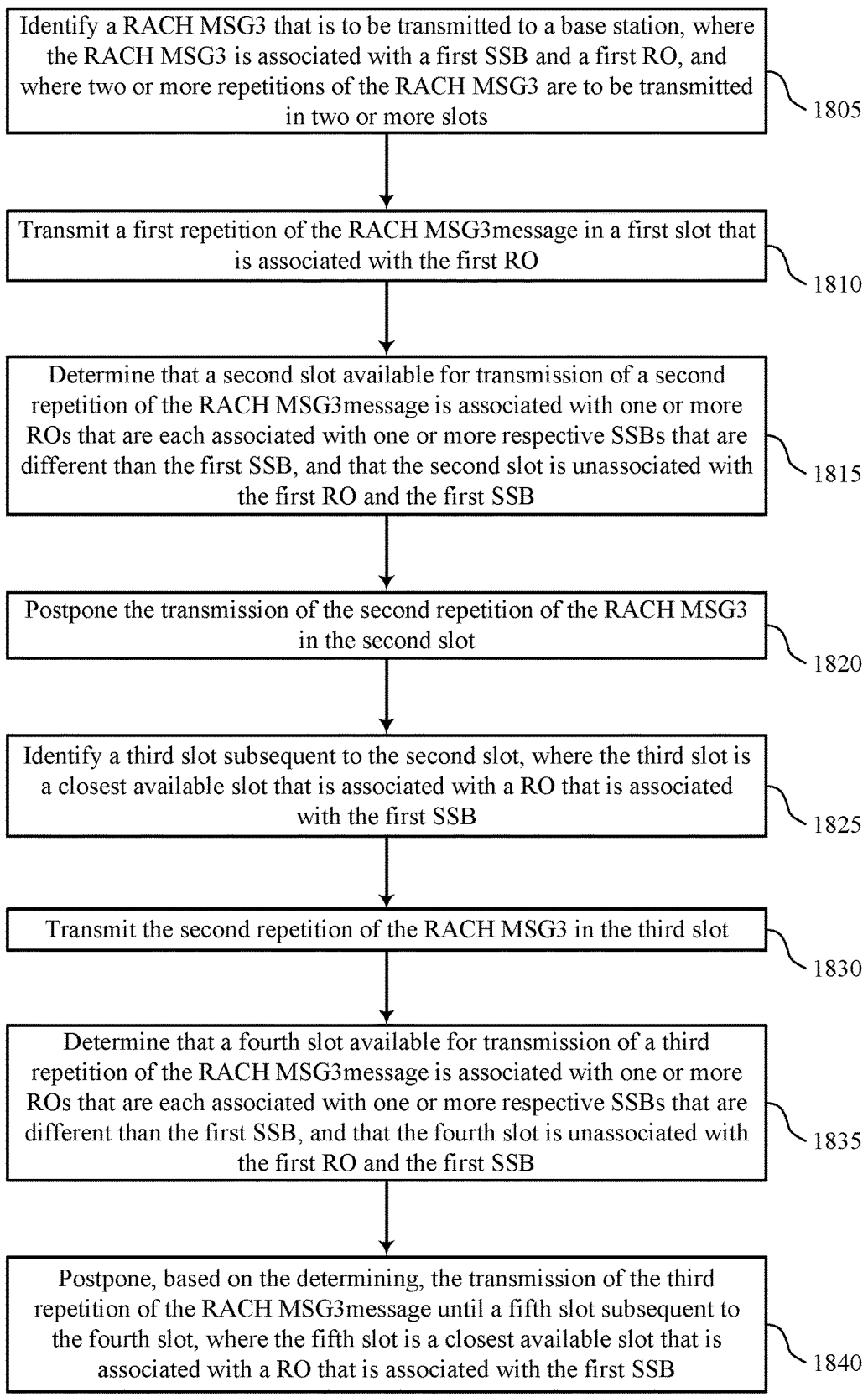

FIG. 18 shows a flowchart illustrating a method 1800 that supports random access message repetition techniques in beamformed communications in accordance with aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1805, the UE may identify a RACH MSG3 that is to be transmitted to a base station, where the RACH MSG3 is associated with a first SSB and a first RO, and where two or more repetitions of the RACH MSG3 are to be transmitted in two or more slots. The operations of 1805 may be performed according to the methods described herein. In some examples, aspects of the operations of 1805 may be performed by a MSG3 repetition manager as described with reference to FIGS. 8 through 11.

At 1810, the UE may transmit a first repetition of the RACH MSG3 in a first slot that is associated with the first RO. The operations of 1810 may be performed according to the methods described herein. In some examples, aspects of the operations of 1810 may be performed by an uplink transmission manager as described with reference to FIGS. 8 through 11.

At 1815, the UE may determine that a second slot available for transmission of a second repetition of the RACH MSG3 is associated with one or more ROs that are each associated with one or more respective SSBs that are different than the first SSB, and that the second slot is unassociated with the first RO and the first SSB. The operations of 1815 may be performed according to the methods described herein. In some examples, aspects of the operations of 1815 may be performed by a RO determination manager as described with reference to FIGS. 8 through 11.

At 1820, the UE may postpone the transmission of the second repetition of the RACH MSG3 in the second slot. The operations of 1820 may be performed according to the methods described herein. In some examples, aspects of the operations of 1820 may be performed by a RO determination manager as described with reference to FIGS. 8 through 11.

At 1825, the UE may identify a third slot subsequent to the second slot, where the third slot is a closest available slot that is associated with a RO that is associated with the first SSB. The operations of 1825 may be performed according to the methods described herein. In some examples, aspects of the operations of 1825 may be performed by a RO determination manager as described with reference to FIGS. 8 through 11.

At 1830, the UE may transmit the second repetition of the RACH MSG3 in the third slot. The operations of 1830 may be performed according to the methods described herein. In some examples, aspects of the operations of 1830 may be performed by a RO determination manager as described with reference to FIGS. 8 through 11.

At 1835, the UE may determine that a fourth slot available for transmission of a third repetition of the RACH MSG3 is associated with one or more ROs that are each associated with one or more respective SSBs that are different than the first SSB, and that the fourth slot is unassociated with the first RO and the first SSB. The operations of 1835 may be performed according to the methods described herein. In some examples, aspects of the operations of 1835 may be performed by a RO determination manager as described with reference to FIGS. 8 through 11.

At 1840, the UE may postpone, based on the determining, the transmission of the third repetition of the RACH MSG3 until a fifth slot subsequent to the fourth slot, where the fifth slot is a closest available slot that is associated with a RO that is associated with the first SSB. The operations of 1840 may be performed according to the methods described herein. In some examples, aspects of the operations of 1840 may be performed by a RO determination manager as described with reference to FIGS. 8 through 11.

Figure 19:
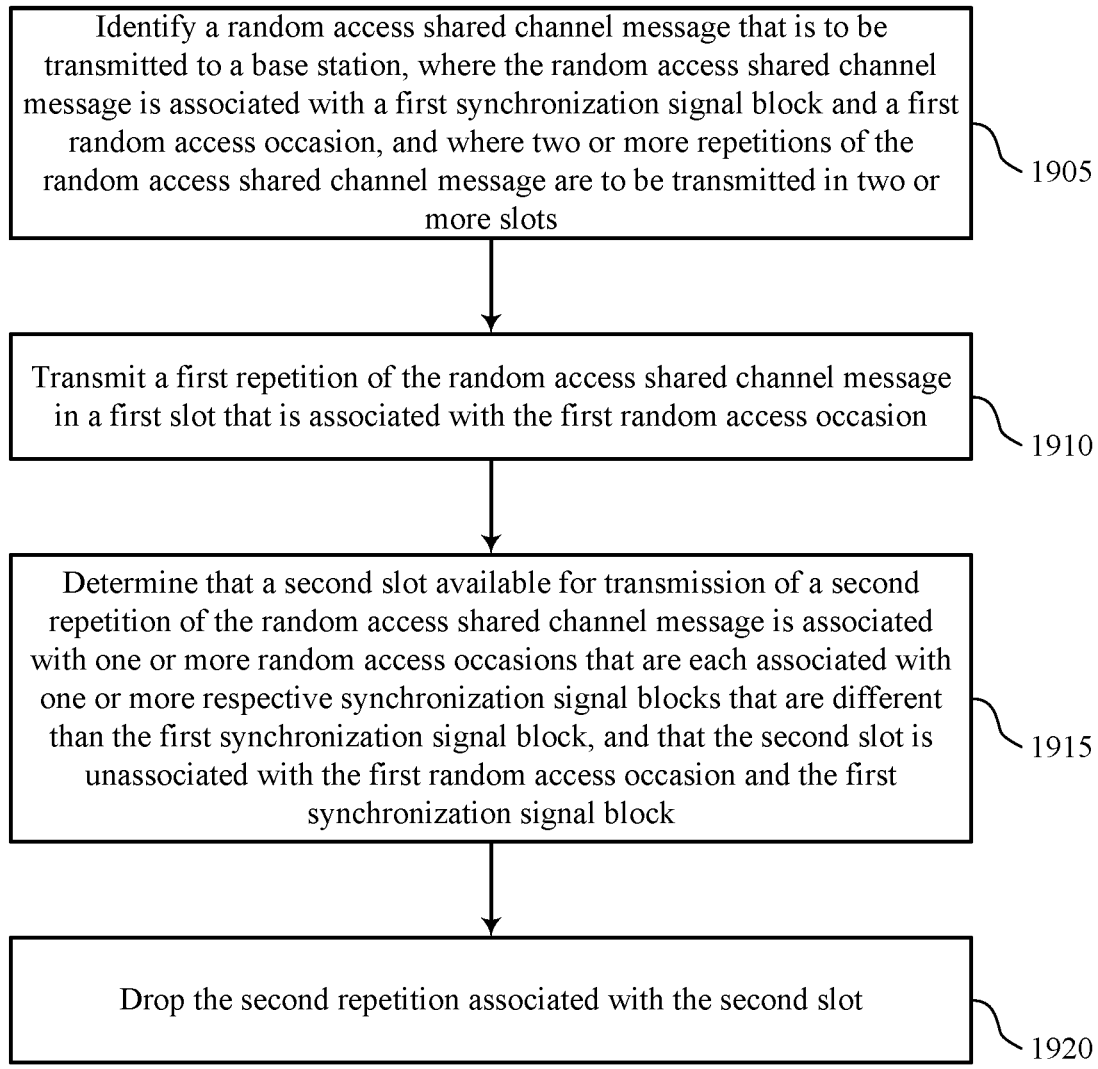

FIG. 19 shows a flowchart illustrating a method 1900 that supports random access message repetition techniques in beamformed communications in accordance with aspects of the present disclosure. The operations of method 1900 may be implemented by a UE 115 or its components as described herein. For example, the operations of method 1900 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1905, the UE may identify a random access shared channel message that is to be transmitted to a base station, where the random access shared channel message is associated with a first synchronization signal block and a first random access occasion, and where two or more repetitions of the random access shared channel message are to be transmitted in two or more slots. The operations of 1905 may be performed according to the methods described herein. In some examples, aspects of the operations of 1905 may be performed by a MSG3 repetition manager as described with reference to FIGS. 8 through 11.

At 1910, the UE may transmit a first repetition of the random access shared channel message in a first slot that is associated with the first random access occasion. The operations of 1910 may be performed according to the methods described herein. In some examples, aspects of the operations of 1910 may be performed by an uplink transmission manager as described with reference to FIGS. 8 through 11.

At 1915, the UE may determine that a second slot available for transmission of a second repetition of the random access shared channel message is associated with one or more random access occasions that are each associated with one or more respective synchronization signal blocks that are different than the first synchronization signal block, and that the second slot is unassociated with the first random access occasion and the first synchronization signal block. The operations of 1915 may be performed according to the methods described herein. In some examples, aspects of the operations of 1915 may be performed by a RO determination manager as described with reference to FIGS. 8 through 11.

At 1920, the UE may drop the second repetition associated with the second slot. The operations of 1920 may be performed according to the methods described herein. In some examples, aspects of the operations of 1920 may be performed by a MSG3 repetition manager as described with reference to FIGS. 8 through 11.

Figure 20:
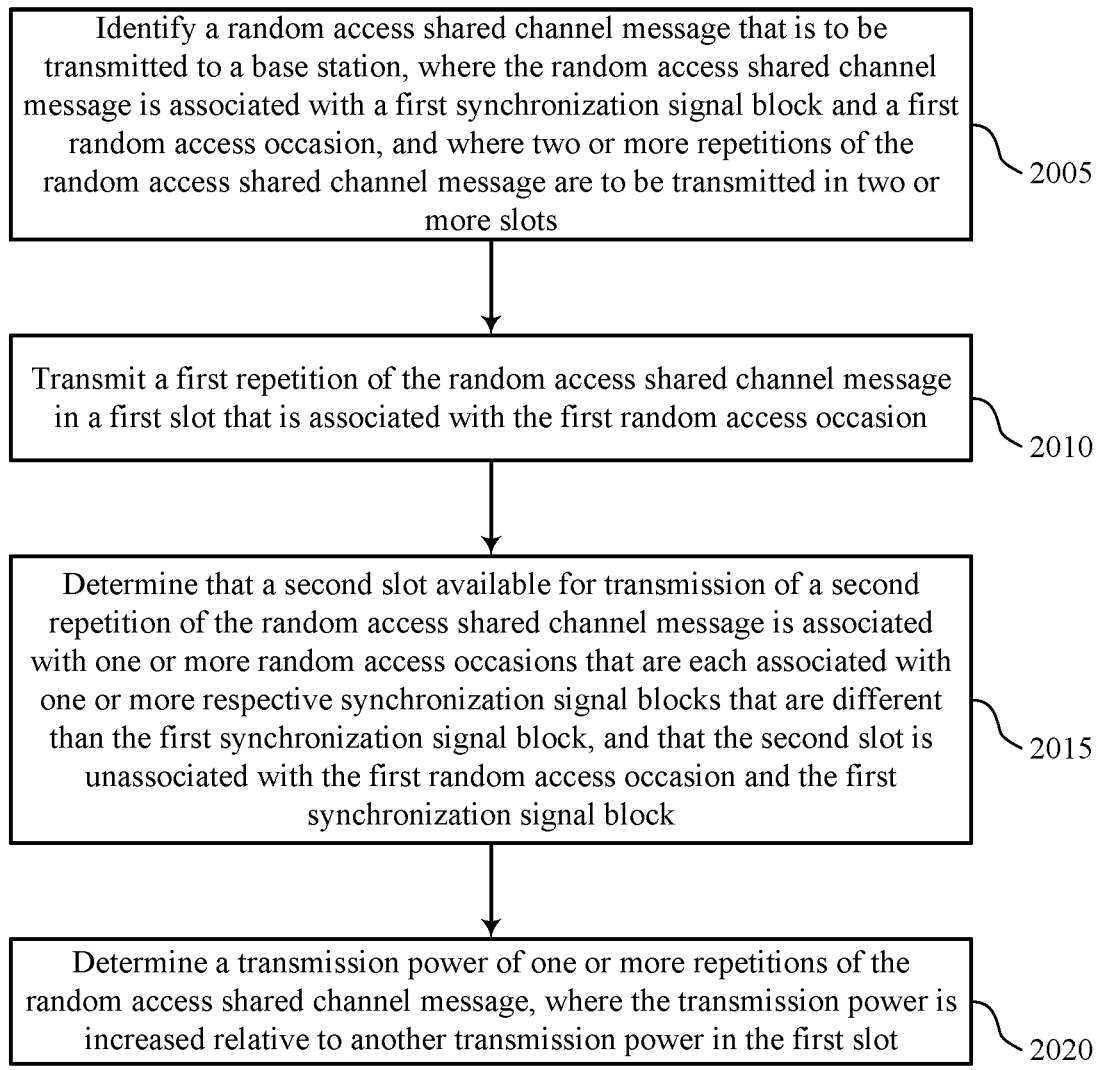

FIG. 20 shows a flowchart illustrating a method 2000 that supports random access message repetition techniques in beamformed communications in accordance with aspects of the present disclosure. The operations of method 2000 may be implemented by a UE 115 or its components as described herein. For example, the operations of method 2000 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 2005, the UE may identify a random access shared channel message that is to be transmitted to a base station, where the random access shared channel message is associated with a first synchronization signal block and a first random access occasion, and where two or more repetitions of the random access shared channel message are to be transmitted in two or more slots. The operations of 2005 may be performed according to the methods described herein. In some examples, aspects of the operations of 2005 may be performed by a MSG3 repetition manager as described with reference to FIGS. 8 through 11.

At 2010, the UE may transmit a first repetition of the random access shared channel message in a first slot that is associated with the first random access occasion. The operations of 2010 may be performed according to the methods described herein. In some examples, aspects of the operations of 2010 may be performed by an uplink transmission manager as described with reference to FIGS. 8 through 11.

At 2015, the UE may determine that a second slot available for transmission of a second repetition of the random access shared channel message is associated with one or more random access occasions that are each associated with one or more respective synchronization signal blocks that are different than the first synchronization signal block, and that the second slot is unassociated with the first random access occasion and the first synchronization signal block. The operations of 2015 may be performed according to the methods described herein. In some examples, aspects of the operations of 2015 may be performed by a RO determination manager as described with reference to FIGS. 8 through 11.

At 2020, the UE may determine a transmission power of one or more repetitions of the random access shared channel message, where the transmission power is increased relative to another transmission power in the first slot. The operations of 2020 may be performed according to the methods described herein. In some examples, aspects of the operations of 2020 may be performed by a MSG3 repetition manager as described with reference to FIGS. 8 through 11.

Figure 21:
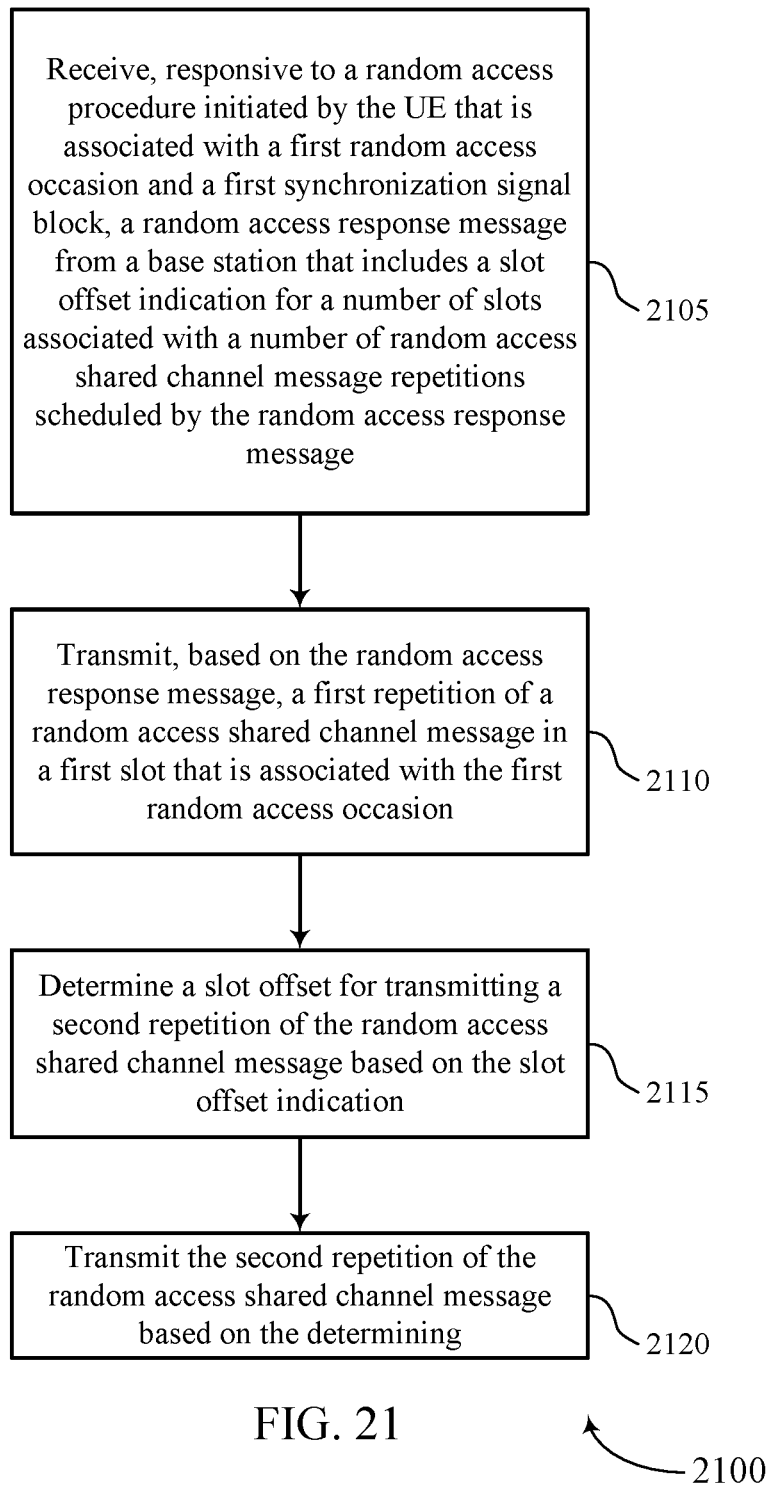

FIG. 21 shows a flowchart illustrating a method 2100 that supports random access message repetition techniques in beamformed communications in accordance with aspects of the present disclosure. The operations of method 2100 may be implemented by a UE 115 or its components as described herein. For example, the operations of method 2100 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 2105, the UE may receive, responsive to a random access procedure initiated by the UE that is associated with a first random access occasion and a first synchronization signal block, a random access response message from a base station that includes a slot offset indication for a number of slots associated with a number of random access shared channel message repetitions scheduled by the random access response message. The operations of 2105 may be performed according to the methods described herein. In some examples, aspects of the operations of 2105 may be performed by a MSG2 reception manager as described with reference to FIGS. 8 through 11.

At 2110, the UE may transmit, based on the random access response message, a first repetition of a random access shared channel message in a first slot that is associated with the first random access occasion. The operations of 2110 may be performed according to the methods described herein. In some examples, aspects of the operations of 2110 may be performed by a MSG3 repetition manager as described with reference to FIGS. 8 through 11.

At 2115, the UE may determine a slot offset for transmitting a second repetition of the random access shared channel message based on the slot offset indication. The operations of 2115 may be performed according to the methods described herein. In some examples, aspects of the operations of 2115 may be performed by a RO determination manager as described with reference to FIGS. 8 through 11.

At 2120, the UE may transmit the second repetition of the random access shared channel message based on the determining. The operations of 2120 may be performed according to the methods described herein. In some examples, aspects of the operations of 2120 may be performed by a RO determination manager as described with reference to FIGS. 8 through 11.

Figure 22:
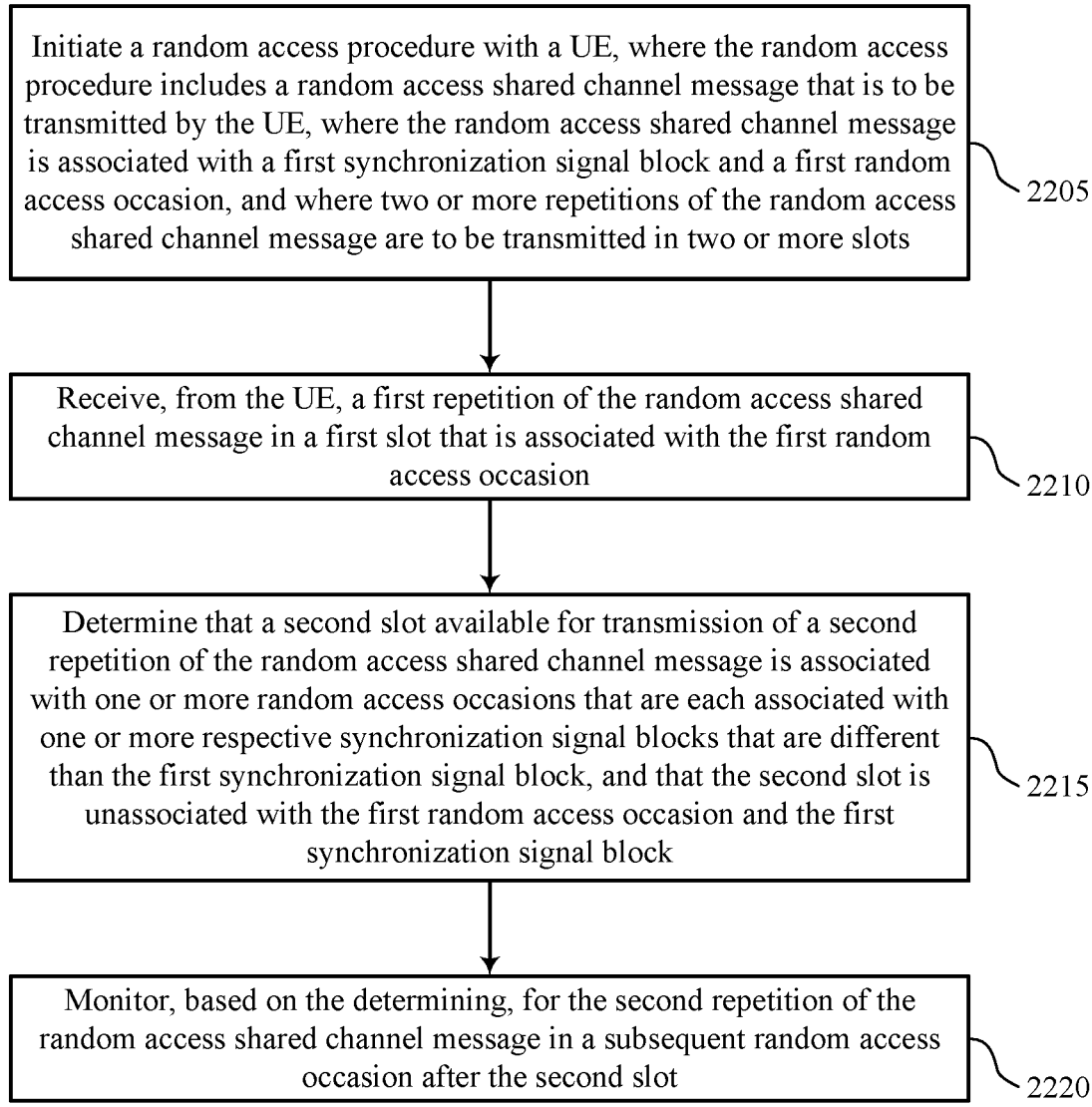

FIG. 22 shows a flowchart illustrating a method 2200 that supports random access message repetition techniques in beamformed communications in accordance with aspects of the present disclosure. The operations of method 2200 may be implemented by a base station 105 or its components as described herein. For example, the operations of method 2200 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2205, the base station may initiate a random access procedure with a UE, where the random access procedure includes a random access shared channel message that is to be transmitted by the UE, where the random access shared channel message is associated with a first synchronization signal block and a first random access occasion, and where two or more repetitions of the random access shared channel message are to be transmitted in two or more slots. The operations of 2205 may be performed according to the methods described herein. In some examples, aspects of the operations of 2205 may be performed by a MSG3 repetition manager as described with reference to FIGS. 12 through 15.

At 2210, the base station may receive, from the UE, a first repetition of the random access shared channel message in a first slot that is associated with the first random access occasion. The operations of 2210 may be performed according to the methods described herein. In some examples, aspects of the operations of 2210 may be performed by a MSG3 repetition manager as described with reference to FIGS. 12 through 15.

At 2215, the base station may determine that a second slot available for transmission of a second repetition of the random access shared channel message is associated with one or more random access occasions that are each associated with one or more respective synchronization signal blocks that are different than the first synchronization signal block, and that the second slot is unassociated with the first random access occasion and the first synchronization signal block. The operations of 2215 may be performed according to the methods described herein. In some examples, aspects of the operations of 2215 may be performed by a RO determination manager as described with reference to FIGS. 12 through 15.

At 2220, the base station may monitor, based on the determining, for the second repetition of the random access shared channel message in a subsequent random access occasion after the second slot. The operations of 2220 may be performed according to the methods described herein. In some examples, aspects of the operations of 2220 may be performed by a RO determination manager as described with reference to FIGS. 12 through 15.

Figure 23:
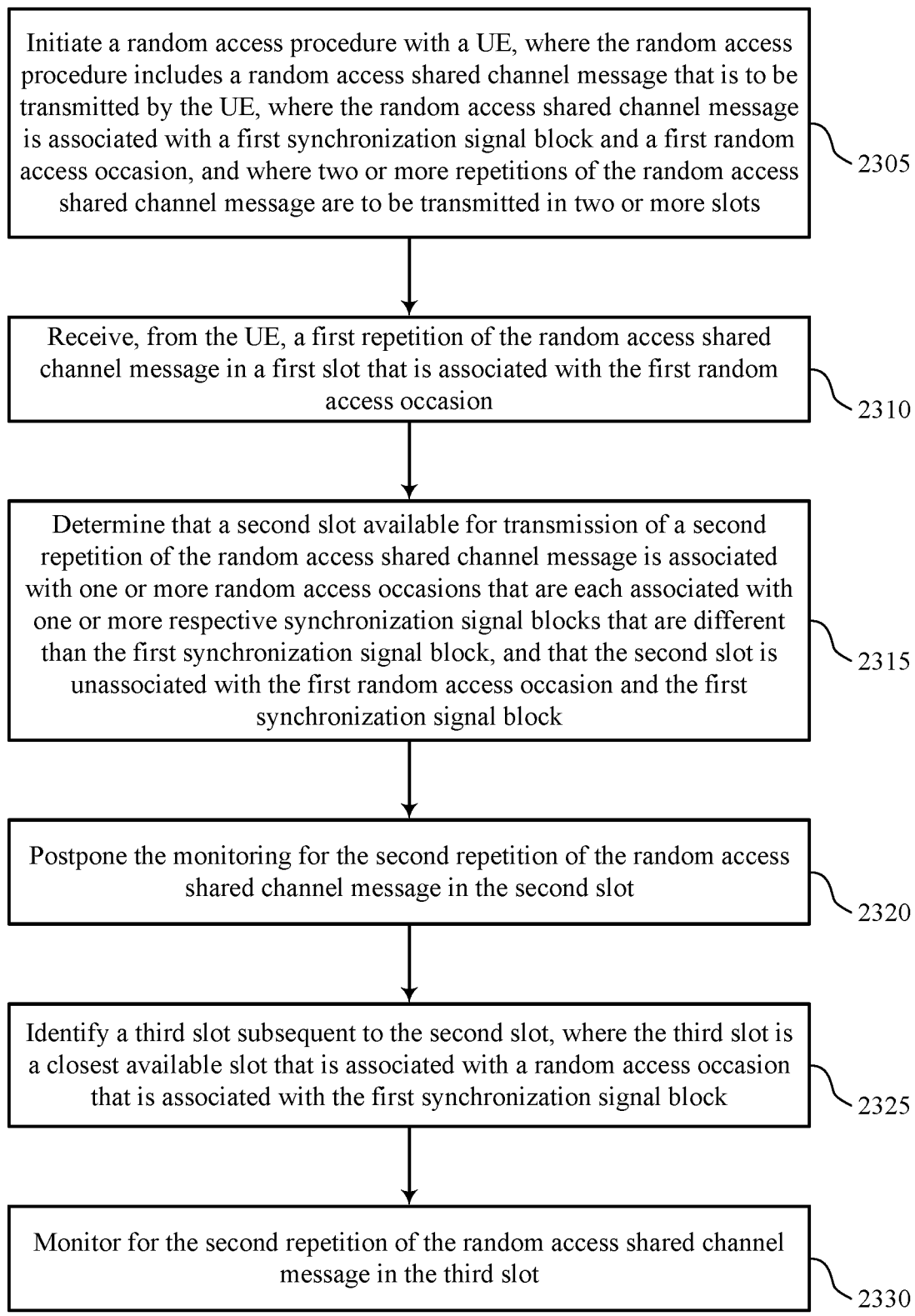

FIG. 23 shows a flowchart illustrating a method 2300 that supports random access message repetition techniques in beamformed communications in accordance with aspects of the present disclosure. The operations of method 2300 may be implemented by a base station 105 or its components as described herein. For example, the operations of method 2300 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2305, the base station may initiate a random access procedure with a UE, where the random access procedure includes a random access shared channel message that is to be transmitted by the UE, where the random access shared channel message is associated with a first synchronization signal block and a first random access occasion, and where two or more repetitions of the random access shared channel message are to be transmitted in two or more slots. The operations of 2305 may be performed according to the methods described herein. In some examples, aspects of the operations of 2305 may be performed by a MSG3 repetition manager as described with reference to FIGS. 12 through 15.

At 2310, the base station may receive, from the UE, a first repetition of the random access shared channel message in a first slot that is associated with the first random access occasion. The operations of 2310 may be performed according to the methods described herein. In some examples, aspects of the operations of 2310 may be performed by a MSG3 repetition manager as described with reference to FIGS. 12 through 15.

At 2315, the base station may determine that a second slot available for transmission of a second repetition of the random access shared channel message is associated with one or more random access occasions that are each associated with one or more respective synchronization signal blocks that are different than the first synchronization signal block, and that the second slot is unassociated with the first random access occasion and the first synchronization signal block. The operations of 2315 may be performed according to the methods described herein. In some examples, aspects of the operations of 2315 may be performed by a RO determination manager as described with reference to FIGS. 12 through 15.

At 2320, the base station may postpone the monitoring for the second repetition of the random access shared channel message in the second slot. The operations of 2320 may be performed according to the methods described herein. In some examples, aspects of the operations of 2320 may be performed by a RO determination manager as described with reference to FIGS. 12 through 15.

At 2325, the base station may identify a third slot subsequent to the second slot, where the third slot is a closest available slot that is associated with a random access occasion that is associated with the first synchronization signal block. The operations of 2325 may be performed according to the methods described herein. In some examples, aspects of the operations of 2325 may be performed by a RO determination manager as described with reference to FIGS. 12 through 15.

At 2330, the base station may monitor for the second repetition of the random access shared channel message in the third slot. The operations of 2330 may be performed according to the methods described herein. In some examples, aspects of the operations of 2330 may be performed by a RO determination manager as described with reference to FIGS. 12 through 15.

Figure 24:
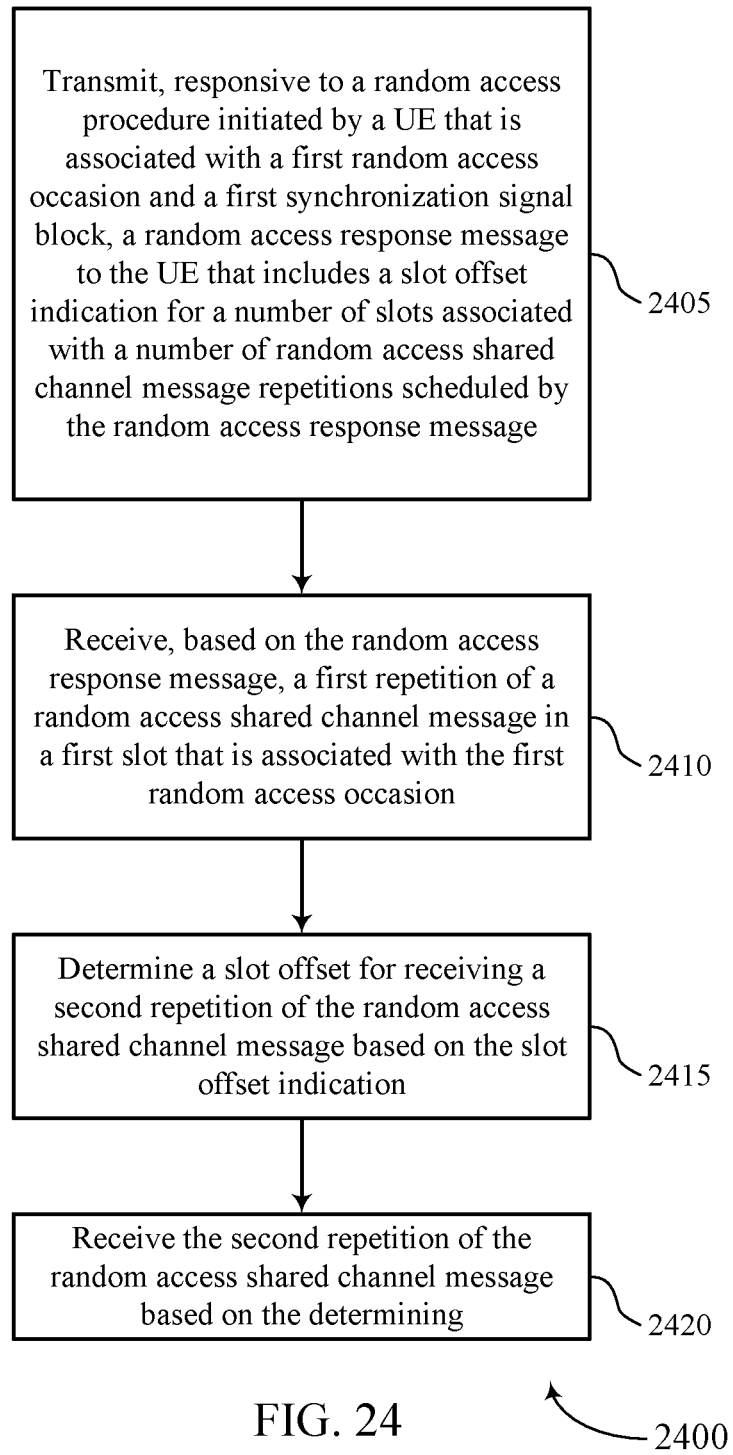

FIG. 24 shows a flowchart illustrating a method 2400 that supports random access message repetition techniques in beamformed communications in accordance with aspects of the present disclosure. The operations of method 2400 may be implemented by a base station 105 or its components as described herein. For example, the operations of method 2400 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2405, the base station may transmit, responsive to a random access procedure initiated by a UE that is associated with a first random access occasion and a first synchronization signal block, a random access response message to the UE that includes a slot offset indication for a number of slots associated with a number of random access shared channel message repetitions scheduled by the random access response message. The operations of 2405 may be performed according to the methods described herein. In some examples, aspects of the operations of 2405 may be performed by a repetition slot configuration manager as described with reference to FIGS. 12 through 15.

At 2410, the base station may receive, based on the random access response message, a first repetition of a random access shared channel message in a first slot that is associated with the first random access occasion. The operations of 2410 may be performed according to the methods described herein. In some examples, aspects of the operations of 2410 may be performed by a MSG3 repetition manager as described with reference to FIGS. 12 through 15.

At 2415, the base station may determine a slot offset for receiving a second repetition of the random access shared channel message based on the slot offset indication. The operations of 2415 may be performed according to the methods described herein. In some examples, aspects of the operations of 2415 may be performed by a repetition slot configuration manager as described with reference to FIGS. 12 through 15.

At 2420, the base station may receive the second repetition of the random access shared channel message based on the determining. The operations of 2420 may be performed according to the methods described herein. In some examples, aspects of the operations of 2420 may be performed by a MSG3 repetition manager as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: identifying a random access shared channel message that is to be transmitted to a base station, wherein the random access shared channel message is associated with a first synchronization signal block and a first random access occasion, and wherein two or more repetitions of the random access shared channel message are to be transmitted in two or more slots; transmitting a first repetition of the random access shared channel message in a first slot that is associated with the first random access occasion; determining that a second slot available for transmission of a second repetition of the random access shared channel message is associated with one or more random access occasions that are each associated with one or more respective synchronization signal blocks that are different than the first synchronization signal block, and that the second slot is unassociated with the first random access occasion and the first synchronization signal block; and modifying, based at least in part on the determining, the transmission of the second repetition of the random access shared channel message.

Aspect 2: The method of aspect 1, wherein the first slot is determined based at least in part on a prior slot that includes a random access response message from the base station that schedules the random access shared channel message, and the first slot is a predetermined number of slots following the prior slot that includes a random access response message.

Aspect 3: The method of any of aspects 1 through 2, wherein the modifying comprises: postponing the transmission of the second repetition of the random access shared channel message in the second slot; identifying a third slot subsequent to the second slot, wherein the third slot is a closest available slot that is associated with a random access occasion that is associated with the first synchronization signal block; and transmitting the second repetition of the random access shared channel message in the third slot.

Aspect 4: The method of aspect 3, further comprising: postponing, based at least in part on the postponing of the second repetition of the random access shared channel message, a transmission of a third repetition of the random access shared channel message until a fourth slot subsequent to the third slot, wherein the fourth slot is a closest available slot that is associated with a random access occasion that is associated with the first synchronization signal block.

Aspect 5: The method of any of aspects 3 through 4, further comprising: determining that a fourth slot available for transmission of a third repetition of the random access shared channel message is associated with one or more random access occasions that are each associated with one or more respective synchronization signal blocks that are different than the first synchronization signal block, and that the fourth slot is unassociated with the first random access occasion and the first synchronization signal block; and postponing, based at least in part on the determining, the transmission of the third repetition of the random access shared channel message until a fifth slot subsequent to the fourth slot, wherein the fifth slot is a closest available slot that is associated with a random access occasion that is associated with the first synchronization signal block.

Aspect 6: The method of any of aspects 1 through 5, wherein the determining is based at least in part on one or more synchronization signal block to random access occasion preamble associations provided in a remaining minimum system information communication of the base station.

Aspect 7: The method of any of aspects 1 through 6, wherein the modifying comprises: dropping the second repetition associated with the second slot.

Aspect 8: The method of any of aspects 1 through 7, wherein the modifying comprises: determining a transmission power of one or more repetitions of the random access shared channel message, wherein the transmission power is increased relative to another transmission power in the first slot.

Aspect 9: The method of any of aspects 1 through 8, further comprising: receiving, from the base station, a slot offset indication in a random access response message, and wherein the determining is based at least in part on the slot offset indication.

Aspect 10: The method of aspect 9, wherein slot offsets for transmitting repetitions of the random access shared channel message are partitioned into two or more bits associated with respective two or more groups of random access shared channel message slots, and wherein a value of each of the two or more bits are determined based at least in part on whether any slot in the associated group of slots is associated with one or more random access occasions that are associated with one or more respective synchronization signal blocks that are different than the first synchronization signal block and not associated with the first random access occasion or the first synchronization signal block.

Aspect 11: The method of aspect 10, wherein the first slot is determined from a first group of the two or more groups of random access shared channel message slots based at least in part on a prior slot that includes a random access response message from the base station that schedules the random access shared channel message, and the first slot is a predetermined number of slots following the prior slot that includes a random access response message.

Aspect 12: The method of aspect 11, further comprising: postponing the transmission of the second repetition of the random access shared channel message in a second slot of the first group based at least in part on the second slot of the first group being associated with one or more random access occasions that are each associated with one or more respective synchronization signal blocks that are different than the first synchronization signal block, and the second slot being unassociated with the first random access occasion and the first synchronization signal block; identifying a third slot of the first group that is subsequent to the second slot of the first group, wherein the third slot of the first group is a closest available slot that is associated with a random access occasion that is associated with the first synchronization signal block; and transmitting the second repetition of the random access shared channel message in the third slot of the first group.

Aspect 13: A method for wireless communication at a UE, comprising: receiving, responsive to a random access procedure initiated by the UE that is associated with a first random access occasion and a first synchronization signal block, a random access response message from a base station that includes a slot offset indication for a number of slots associated with a number of random access shared channel message repetitions scheduled by the random access response message; transmitting, based at least in part on the random access response message, a first repetition of a random access shared channel message in a first slot that is associated with the first random access occasion; determining a slot offset for transmitting a second repetition of the random access shared channel message based at least in part on the slot offset indication; and transmitting the second repetition of the random access shared channel message based at least in part on the determining.

Aspect 14: The method of aspect 13, wherein the slot offset indication provides a slot offset value from zero to a positive integer, for each random access shared channel message repetition of the random access shared channel message repetitions subsequent to the first random access shared channel message.

Aspect 15: The method of any of aspects 13 through 14, further comprising: receiving, from the base station, system information that indicates a mapping between possible slot offset values and a number of offset slots.

Aspect 16: The method of any of aspects 13 through 15, wherein the slot offset indication is included in a prespecified number of bits in the random access response message.

Aspect 17: The method of any of aspects 13 through 16, wherein slot offsets for transmitting repetitions of the random access shared channel message are partitioned into two or more bits associated with respective two or more groups of random access shared channel message slots, and wherein a value of each of the two or more bits are determined based at least in part on whether any slot in the associated group of slots is associated with one or more random access occasions that are associated with one or more respective synchronization signal blocks that are different than the first synchronization signal block and not associated with the first random access occasion or the first synchronization signal block.

Aspect 18: The method of aspect 17, wherein the first slot is determined from a first group of the two or more groups of random access shared channel message slots based at least in part on a prior slot that includes a random access response message from the base station that schedules the random access shared channel message, and the first slot is a predetermined number of slots following the prior slot that includes a random access response message.

Aspect 19: The method of aspect 18, further comprising: postponing the transmission of the second repetition of the random access shared channel message in a second slot of the first group based at least in part on the second slot of the first group being associated with one or more random access occasions that are each associated with one or more respective synchronization signal blocks that are different than the first synchronization signal block, and the second slot being unassociated with the first random access occasion and the first synchronization signal block; identifying a third slot of the first group that is subsequent to the second slot of the first group, wherein the third slot of the first group is a closest available slot that is associated with a random access occasion that is associated with the first synchronization signal block; and transmitting the second repetition of the random access shared channel message in the third slot of the first group.

Aspect 20: A method for wireless communication at a base station, comprising: initiating a random access procedure with a UE, wherein the random access procedure includes a random access shared channel message that is to be transmitted by the UE, wherein the random access shared channel message is associated with a first synchronization signal block and a first random access occasion, and wherein two or more repetitions of the random access shared channel message are to be transmitted in two or more slots; receiving, from the UE, a first repetition of the random access shared channel message in a first slot that is associated with the first random access occasion; determining that a second slot available for transmission of a second repetition of the random access shared channel message is associated with one or more random access occasions that are each associated with one or more respective synchronization signal blocks that are different than the first synchronization signal block, and that the second slot is unassociated with the first random access occasion and the first synchronization signal block; and monitoring, based at least in part on the determining, for the second repetition of the random access shared channel message in a subsequent random access occasion after the second slot.

Aspect 21: The method of aspect 20, wherein the first slot is determined based at least in part on a prior slot that includes a random access response message from the base station that schedules the random access shared channel message, and the first slot is a predetermined number of slots following the prior slot that includes a random access response message.

Aspect 22: The method of any of aspects 20 through 21, wherein the monitoring comprises: postponing the monitoring for the second repetition of the random access shared channel message in the second slot; identifying a third slot subsequent to the second slot, wherein the third slot is a closest available slot that is associated with a random access occasion that is associated with the first synchronization signal block; and monitoring for the second repetition of the random access shared channel message in the third slot.

Aspect 23: The method of aspect 22, further comprising: postponing, based at least in part on the postponing of monitoring for the second repetition of the random access shared channel message, monitoring for a third repetition of the random access shared channel message until a fourth slot subsequent to the third slot, wherein the fourth slot is a closest available slot that is associated with a random access occasion that is associated with the first synchronization signal block.

Aspect 24: The method of any of aspects 22 through 23, further comprising: determining that a fourth slot available for transmission of a third repetition of the random access shared channel message is associated with one or more random access occasions that are each associated with one or more respective synchronization signal blocks that are different than the first synchronization signal block, and that the fourth slot is unassociated with the first random access occasion and the first synchronization signal block; and postponing, based at least in part on the determining, monitoring for the third repetition of the random access shared channel message until a fifth slot subsequent to the fourth slot, wherein the fifth slot is a closest available slot that is associated with a random access occasion that is associated with the first synchronization signal block.

Aspect 25: The method of any of aspects 20 through 24, wherein the determining is based at least in part on one or more synchronization signal block-to-random access occasion preamble associations provided in a remaining minimum system information communication of the base station.

Aspect 26: The method of any of aspects 20 through 25, wherein the second repetition associated with the second slot is dropped.

Aspect 27: The method of any of aspects 20 through 26, wherein a transmission power of one or more repetitions of the random access shared channel message is increased relative to another transmission power in the first slot.

Aspect 28: The method of any of aspects 20 through 27, further comprising: transmitting, to the UE, a slot offset indication in a random access response message, and wherein the determining is based at least in part on the slot offset indication.

Aspect 29: The method of aspect 28, wherein slot offsets for transmitting repetitions of the random access shared channel message are partitioned into two or more bits associated with respective two or more groups of random access shared channel message slots, and wherein a value of each of the two or more bits are determined based at least in part on whether any slot in the associated group of slots is associated with one or more random access occasions that are associated with one or more respective synchronization signal blocks that are different than the first synchronization signal block and not associated with the first random access occasion or the first synchronization signal block.

Aspect 30: The method of aspect 29, wherein the first slot is determined from a first group of the two or more groups of random access shared channel message slots based at least in part on a prior slot that includes a random access response message from the base station that schedules the random access shared channel message, and the first slot is a predetermined number of slots following the prior slot that includes a random access response message.

Aspect 31: The method of aspect 30, further comprising: postponing the monitoring for the second repetition of the random access shared channel message in a second slot of the first group based at least in part on the second slot of the first group being associated with one or more random access occasions that are each associated with one or more respective synchronization signal blocks that are different than the first synchronization signal block, and the second slot being unassociated with the first random access occasion and the first synchronization signal block; identifying a third slot of the first group that is subsequent to the second slot of the first group, wherein the third slot of the first group is a closest available slot that is associated with a random access occasion that is associated with the first synchronization signal block; and monitoring for the second repetition of the random access shared channel message in the third slot of the first group.

Aspect 32: A method for wireless communication at a base station, comprising: transmitting, responsive to a random access procedure initiated by a UE that is associated with a first random access occasion and a first synchronization signal block, a random access response message to the UE that includes a slot offset indication for a number of slots associated with a number of random access shared channel message repetitions scheduled by the random access response message; receiving, based at least in part on the random access response message, a first repetition of a random access shared channel message in a first slot that is associated with the first random access occasion; determining a slot offset for receiving a second repetition of the random access shared channel message based at least in part on the slot offset indication; and receiving the second repetition of the random access shared channel message based at least in part on the determining.

Aspect 33: The method of aspect 32, wherein the slot offset indication provides a slot offset value from zero to a positive integer, for each random access shared channel message repetition of the random access shared channel message repetitions subsequent to the first random access shared channel message.

Aspect 34: The method of any of aspects 32 through 33, further comprising: transmitting, to the UE, system information that indicates a mapping between possible slot offset values and a number of offset slots.

Aspect 35: The method of any of aspects 32 through 34, wherein the slot offset indication is included in a prespecified number of bits in the random access response message.

Aspect 36: The method of any of aspects 32 through 35, wherein slot offsets for transmitting repetitions of the random access shared channel message are partitioned into two or more bits associated with respective two or more groups of random access shared channel message slots, and wherein a value of each of the two or more bits are determined based at least in part on whether any slot in the associated group of slots is associated with one or more random access occasions that are associated with one or more respective synchronization signal blocks that are different than the first synchronization signal block and not associated with the first random access occasion or the first synchronization signal block.

Aspect 37: The method of aspect 36, wherein the first slot is determined from a first group of the two or more groups of random access shared channel message slots based at least in part on a prior slot that includes a random access response message from the base station that schedules the random access shared channel message, and the first slot is a predetermined number of slots following the prior slot that includes a random access response message.

Aspect 38: The method of aspect 37, further comprising: postponing the receiving of the second repetition of the random access shared channel message in a second slot of the first group based at least in part on the second slot of the first group being associated with one or more random access occasions that are each associated with one or more respective synchronization signal blocks that are different than the first synchronization signal block, and the second slot being unassociated with the first random access occasion and the first synchronization signal block; identifying a third slot of the first group that is subsequent to the second slot of the first group, wherein the third slot of the first group is a closest available slot that is associated with a random access occasion that is associated with the first synchronization signal block; and receiving the second repetition of the random access shared channel message in the third slot of the first group.

Aspect 39: An apparatus for wireless communication at a UE, comprising at least one processor; memory coupled with the at least one processor; and instructions stored in the memory and executable by the at least one processor to cause the apparatus to perform a method of any of aspects 1 through 12.

Aspect 40: An apparatus for wireless communication at a UE, comprising at least one means for performing a method of any of aspects 1 through 12.

Aspect 41: A non-transitory computer-readable medium storing code for wireless communication at a UE, the code comprising instructions executable by at least one processor to perform a method of any of aspects 1 through 12.

Aspect 42: An apparatus for wireless communication at a UE, comprising at least one processor; memory coupled with the at least one processor; and instructions stored in the memory and executable by the at least one processor to cause the apparatus to perform a method of any of aspects 13 through 19.

Aspect 43: An apparatus for wireless communication at a UE, comprising at least one means for performing a method of any of aspects 13 through 19.

Aspect 44: A non-transitory computer-readable medium storing code for wireless communication at a UE, the code comprising instructions executable by at least one processor to perform a method of any of aspects 13 through 19.

Aspect 45: An apparatus for wireless communication at a base station, comprising at least one processor; memory coupled with the at least one processor; and instructions stored in the memory and executable by the at least one processor to cause the apparatus to perform a method of any of aspects 20 through 31.

Aspect 46: An apparatus for wireless communication at a base station, comprising at least one means for performing a method of any of aspects 20 through 31.

Aspect 47: A non-transitory computer-readable medium storing code for wireless communication at a base station, the code comprising instructions executable by at least one processor to perform a method of any of aspects 20 through 31.

Aspect 48: An apparatus for wireless communication at a base station, comprising at least one processor; memory coupled with the at least one processor; and instructions stored in the memory and executable by the at least one processor to cause the apparatus to perform a method of any of aspects 32 through 38.

Aspect 49: An apparatus for wireless communication at a base station, comprising at least one means for performing a method of any of aspects 32 through 38.

Aspect 50: A non-transitory computer-readable medium storing code for wireless communication at a base station, the code comprising instructions executable by at least one processor to perform a method of any of aspects 32 through 38.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    identifying a random access shared channel message that is to be transmitted to a base station, wherein the random access shared channel message is associated with a first synchronization signal block and a first random access occasion, and wherein two or more repetitions of the random access shared channel message are to be transmitted in two or more slots;
    transmitting a first repetition of the random access shared channel message in a first slot that is associated with the first random access occasion;
    determining that a second slot available for transmission of a second repetition of the random access shared channel message is associated with one or more random access occasions that are each associated with one or more respective synchronization signal blocks that are different than the first synchronization signal block, and that the second slot is unassociated with the first random access occasion and the first synchronization signal block; and
    modifying, based at least in part on the determining, the transmission of the second repetition of the random access shared channel message.

2. The method of claim 1, wherein the first slot is determined based at least in part on a prior slot that includes a random access response message from the base station that schedules the random access shared channel message, and wherein the first slot is a predetermined number of slots following the prior slot that includes a random access response message.

3. The method of claim 1, wherein the modifying comprises:
    postponing the transmission of the second repetition of the random access shared channel message in the second slot;

identifying a third slot subsequent to the second slot, wherein the third slot is a closest available slot that is associated with a random access occasion that is associated with the first synchronization signal block; and transmitting the second repetition of the random access shared channel message in the third slot.

4. The method of claim 3, further comprising:

postponing, based at least in part on the postponing of the second repetition of the random access shared channel message, a transmission of a third repetition of the random access shared channel message until a fourth slot subsequent to the third slot, wherein the fourth slot is a closest available slot that is associated with a random access occasion that is associated with the first synchronization signal block.

5. The method of claim 3, further comprising:

determining that a fourth slot available for transmission of a third repetition of the random access shared channel message is associated with one or more random access occasions that are each associated with one or more respective synchronization signal blocks that are different than the first synchronization signal block, and that the fourth slot is unassociated with the first random access occasion and the first synchronization signal block; and postponing, based at least in part on the determining, the transmission of the third repetition of the random access shared channel message until a fifth slot subsequent to the fourth slot, wherein the fifth slot is a closest available slot that is associated with a random access occasion that is associated with the first synchronization signal block.

6. The method of claim 1, wherein the determining is based at least in part on one or more synchronization signal block to random access occasion preamble associations provided in a remaining minimum system information communication of the base station.

7. The method of claim 1, wherein the modifying comprises:

dropping the second repetition associated with the second slot.

8. The method of claim 1, wherein the modifying comprises:

determining a transmission power of one or more repetitions of the random access shared channel message, wherein the transmission power is increased relative to another transmission power in the first slot.

9. The method of claim 1, further comprising:

receiving, from the base station, a slot offset indication in a random access response message, and wherein the determining is based at least in part on the slot offset indication.

10. The method of claim 9, wherein slot offsets for transmitting repetitions of the random access shared channel message are partitioned into two or more bits associated with respective two or more groups of random access shared channel message slots, and wherein a value of each of the two or more bits are determined based at least in part on whether any slot in the associated group of slots is associated with one or more random access occasions that are associated with one or more respective synchronization signal blocks that are different than the first synchronization signal block and not associated with the first random access occasion or the first synchronization signal block.

11. The method of claim 10, wherein the first slot is determined from a first group of the two or more groups of random access shared channel message slots based at least in part on a prior slot that includes a random access response message from the base station that schedules the random access shared channel message, and wherein the first slot is a predetermined number of slots following the prior slot that includes a random access response message.

12. The method of claim 11, further comprising:

postponing the transmission of the second repetition of the random access shared channel message in a second slot of the first group based at least in part on the second slot of the first group being associated with one or more random access occasions that are each associated with one or more respective synchronization signal blocks that are different than the first synchronization signal block, and the second slot being unassociated with the first random access occasion and the first synchronization signal block;

identifying a third slot of the first group that is subsequent to the second slot of the first group, wherein the third slot of the first group is a closest available slot that is associated with a random access occasion that is associated with the first synchronization signal block; and transmitting the second repetition of the random access shared channel message in the third slot of the first group.

13. A method for wireless communication at a base station, comprising:

initiating a random access procedure with a user equipment (UE), wherein the random access procedure includes a random access shared channel message that is to be transmitted by the UE, wherein the random access shared channel message is associated with a first synchronization signal block and a first random access occasion, and wherein two or more repetitions of the random access shared channel message are to be transmitted in two or more slots;

receiving, from the UE, a first repetition of the random access shared channel message in a first slot that is associated with the first random access occasion;

determining that a second slot available for transmission of a second repetition of the random access shared channel message is associated with one or more random access occasions that are each associated with one or more respective synchronization signal blocks that are different than the first synchronization signal block, and that the second slot is unassociated with the first random access occasion and the first synchronization signal block; and monitoring, based at least in part on the determining, for the second repetition of the random access shared channel message in a subsequent random access occasion after the second slot.

14. The method of claim 13, wherein the first slot is determined based at least in part on a prior slot that includes a random access response message from the base station that schedules the random access shared channel message, and wherein the first slot is a predetermined number of slots following the prior slot that includes a random access response message.

15. The method of claim 13, wherein the monitoring comprises:

postponing the monitoring for the second repetition of the random access shared channel message in the second slot;

identifying a third slot subsequent to the second slot, wherein the third slot is a closest available slot that is associated with a random access occasion that is associated with the first synchronization signal block; and monitoring for the second repetition of the random access shared channel message in the third slot.

16. The method of claim 15, further comprising:
postponing, based at least in part on the postponing of monitoring for the second repetition of the random access shared channel message, monitoring for a third repetition of the random access shared channel message until a fourth slot subsequent to the third slot, wherein the fourth slot is a closest available slot that is associated with a random access occasion that is associated with the first synchronization signal block.

17. The method of claim 15, further comprising:
determining that a fourth slot available for transmission of a third repetition of the random access shared channel message is associated with one or more random access occasions that are each associated with one or more respective synchronization signal blocks that are different than the first synchronization signal block, and that the fourth slot is unassociated with the first random access occasion and the first synchronization signal block; and
postponing, based at least in part on the determining, monitoring for the third repetition of the random access shared channel message until a fifth slot subsequent to the fourth slot, wherein the fifth slot is a closest available slot that is associated with a random access occasion that is associated with the first synchronization signal block.

18. The method of claim 13, wherein the determining is based at least in part on one or more synchronization signal block-to-random access occasion preamble associations provided in a remaining minimum system information communication of the base station.

19. The method of claim 13, wherein the second repetition associated with the second slot is dropped.

20. The method of claim 13, wherein a transmission power of one or more repetitions of the random access shared channel message is increased relative to another transmission power in the first slot.

21. The method of claim 13, further comprising:
transmitting, to the UE, a slot offset indication in a random access response message, and wherein the determining is based at least in part on the slot offset indication.

22. The method of claim 21, wherein slot offsets for transmitting repetitions of the random access shared channel message are partitioned into two or more bits associated with respective two or more groups of random access shared channel message slots, and wherein a value of each of the two or more bits are determined based at least in part on whether any slot in the associated group of slots is associated with one or more random access occasions that are associated with one or more respective synchronization signal blocks that are different than the first synchronization signal block and not associated with the first random access occasion or the first synchronization signal block.

23. The method of claim 22, wherein the first slot is determined from a first group of the two or more groups of random access shared channel message slots based at least in part on a prior slot that includes a random access response message from the base station that schedules the random access shared channel message, and wherein the first slot is a predetermined number of slots following the prior slot that includes a random access response message.

24. The method of claim 23, further comprising:
postponing the monitoring for the second repetition of the random access shared channel message in a second slot of the first group based at least in part on the second slot of the first group being associated with one or more random access occasions that are each associated with one or more respective synchronization signal blocks that are different than the first synchronization signal block, and the second slot being unassociated with the first random access occasion and the first synchronization signal block;
identifying a third slot of the first group that is subsequent to the second slot of the first group, wherein the third slot of the first group is a closest available slot that is associated with a random access occasion that is associated with the first synchronization signal block; and
monitoring for the second repetition of the random access shared channel message in the third slot of the first group.

25. An apparatus for wireless communication at a user equipment (UE), comprising:
at least one processor,
memory coupled with the at least one processor; and
instructions stored in the memory and executable by the at least one processor to cause the apparatus to:
identify a random access shared channel message that is to be transmitted to a base station, wherein the random access shared channel message is associated with a first synchronization signal block and a first random access occasion, and wherein two or more repetitions of the random access shared channel message are to be transmitted in two or more slots;
transmit a first repetition of the random access shared channel message in a first slot that is associated with the first random access occasion;
determine that a second slot available for transmission of a second repetition of the random access shared channel message is associated with one or more random access occasions that are each associated with one or more respective synchronization signal blocks that are different than the first synchronization signal block, and that the second slot is unassociated with the first random access occasion and the first synchronization signal block; and
modify, based at least in part on the determining, the transmission of the second repetition of the random access shared channel message.

26. The apparatus of claim 25, wherein the first slot is determined based at least in part on a prior slot that includes a random access response message from the base station that schedules the random access shared channel message, and wherein the first slot is a predetermined number of slots following the prior slot that includes a random access response message.

27. The apparatus of claim 25, wherein the instructions are further executable by the at least one processor to cause the apparatus to:
postpone the transmission of the second repetition of the random access shared channel message in the second slot;
identify a third slot subsequent to the second slot, wherein the third slot is a closest available slot that is associated with a random access occasion that is associated with the first synchronization signal block; and
transmit the second repetition of the random access shared channel message in the third slot.

28. An apparatus for wireless communication at a base station, comprising:
at least one processor,
memory coupled with the at least one processor; and instructions stored in the memory and executable by the at least one processor to cause the apparatus to:

initiate a random access procedure with a user equipment (UE),
wherein the random access procedure includes a random access shared channel message that is to be transmitted by the UE, wherein the random access shared channel message is associated with a first synchronization signal block and a first random access occasion, and wherein two or more repetitions of the random access shared channel message are to be transmitted in two or more slots;

receive, from the UE, a first repetition of the random access shared channel message in a first slot that is associated with the first random access occasion;

determine that a second slot available for transmission of a second repetition of the random access shared channel message is associated with one or more random access occasions that are each associated with one or more respective synchronization signal blocks that are different than the first synchronization signal block, and that the second slot is unassociated with the first random access occasion and the first synchronization signal block; and monitor, based at least in part on the determining, for the second repetition of the random access shared channel message in a subsequent random access occasion after the second slot.

29. The apparatus of claim 28, wherein the first slot is determined based at least in part on a prior slot that includes a random access response message from the base station that schedules the random access shared channel message, and wherein the first slot is a predetermined number of slots following the prior slot that includes a random access response message.

30. The apparatus of claim 28, wherein the instructions are further executable by the at least one processor to cause the apparatus to:

postpone the monitoring for the second repetition of the random access shared channel message in the second slot;

identify a third slot subsequent to the second slot, wherein the third slot is a closest available slot that is associated with a random access occasion that is associated with the first synchronization signal block; and monitor for the second repetition of the random access shared channel message in the third slot.

* * * * *